US007140494B2

(12) United States Patent
Fujimoto et al.

(10) Patent No.: US 7,140,494 B2
(45) Date of Patent: Nov. 28, 2006

(54) CENTRIFUGAL MACHINE

(75) Inventors: Koji Fujimoto, Tokyo (JP); Atsushi Onodera, Tokyo (JP); Jun Ohashi, Tokyo (JP); Motoki Numata, Fukuoka (JP); Takayuki Isogai, Fukuoka (JP); Katsunori Fukuda, Fukuoka (JP)

(73) Assignees: Tomoe Engineering Co., Ltd., Tokyo (JP); Mitsubishi Chemical Corporation, Tokyo (JP)

( * ) Notice: Subject to any disclaimer, the term of this patent is extended or adjusted under 35 U.S.C. 154(b) by 8 days.

(21) Appl. No.: 10/540,472

(22) PCT Filed: Dec. 26, 2003

(86) PCT No.: PCT/JP03/16873

§ 371 (c)(1),
(2), (4) Date: Jun. 23, 2005

(87) PCT Pub. No.: WO2004/058410

PCT Pub. Date: Jul. 15, 2004

(65) Prior Publication Data

US 2006/0151377 A1 Jul. 13, 2006

(30) Foreign Application Priority Data

Dec. 26, 2002 (JP) ....................... PCT/JP02/13612
Dec. 26, 2002 (JP) ....................... PCT/JP02/13613

(51) Int. Cl.
*B04B 3/04* (2006.01)
*B01D 33/06* (2006.01)
*B01D 33/50* (2006.01)

(52) U.S. Cl. ....................... 210/369; 210/374; 210/391

(58) Field of Classification Search ............. 210/360.1, 210/369, 372, 374, 380.1, 391
See application file for complete search history.

(56) References Cited

U.S. PATENT DOCUMENTS 1,940,585 A * 12/1933 Fauth ......................... 422/271
5,338,451 A * 8/1994 Lindberg et al. ............ 210/405
5,632,907 A * 5/1997 Norbury ...................... 210/787
5,904,858 A * 5/1999 Turchetti .................... 210/767
6,478,163 B1 * 11/2002 Otsuka ....................... 210/374

FOREIGN PATENT DOCUMENTS

JP 10-28899 * 2/1998

(Continued)

*Primary Examiner*—Fred G. Prince
(74) *Attorney, Agent, or Firm*—Takeuchi&Kubotera, LLP

(57) ABSTRACT

A screen bowl type centrifugal separator which can not only eliminate the problem of the productivity being lowered resulting from the occurrence of clogging with the crystals in the screen part, but also minimize the amount of leakage of the object to be treated in the screen part. Inside of the hub (41) of the screw conveyor (40), a cleaning liquid receiving part (43) which receives the cleaning liquid for the cleaning nozzle (45) is provided, and further, in the cleaning liquid receiving part (43), a residual layer crystal cleaning liquid receiving part (46) which receives the cleaning liquid for cleaning the residual layer object to be treated in the screen part (30) is provided, being partitioned independently of the inside of the cleaning liquid receiving part (43). The cleaning liquid which has been supplied to the inside of the residual layer crystal cleaning liquid receiving part (46) is jet spouted directly toward the residual layer object to be treated from the outer circumferential edge of the flight (42) through the residual layer crystal cleaning liquid path provided along the direction of the helix of the flight (42), with no relation to said cleaning liquid receiving part (43).

19 Claims, 16 Drawing Sheets

FOREIGN PATENT DOCUMENTS

| | | | |
|---|---|---|---|
| JP | 2000-325833 | | 11/2000 |
| JP | P2000-350946 | * | 12/2000 |

* cited by examiner

CENTRIFUGAL MACHINE

FIELD OF THE INVENTION

The present invention relates to a centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part. Such a centrifugal separator is used for purification of a variety of crystals in the field of the chemical industry and the food industry.

BACKGROUND

With conventional screen bowl type centrifugal separators, when a feed stock consisting of crystalline solid matters and a solvent is supplied to the inside of the bowl, the feed stock is separated into the crystals, which are the object to be treated, and the solvent by the centrifugal force, the crystals being settled onto the inner circumferential surface of the bowl, conveyed by the screw conveyor which is provided with a minute difference in speed between it and the bowl, and subjected to deliquidization at the tapered part provided on one side of the bowl.

The deliquidized crystals generally have impurities produced in the process of manufacture thereof, and the solvent itself deposited on their surfaces, and in order to clean these surplus deposits, a screen part has conventionally been provided on the inner circumferential side of the bowl following the tapered part, with cleaning nozzles which jet spout the cleaning liquid toward the pertinent portion being provided in the hub of the screw conveyor for carrying out cleaning by jet spouting the cleaning liquid all over the crystals which are being conveyed in the screen part. For example, refer to the patent literature 1 (Japanese Laid-Open Publication No. 2000-325833).

However, with the screen bowl type centrifugal separator as mentioned above, the crystals will not be conveyed by the conveyor in the clearance in the radial direction that is formed between the outer circumferential edge of the flight of the screw conveyor and the inner circumferential surface of the screen part, the residual layer of crystals being pressed against the outer circumferential edge of the flight to be firmly tightened without being moved in a long period of time of operation.

The crystals forming such a residual layer present a problem that they impede not only the penetration of the cleaning liquid, but also the movement of themselves for replacement with new residual layer crystals. Such a condition is generally called screen clogging. To eliminate the condition of clogged screen, it has been required to temporarily stop the supply of the feed stock, and instead, supply the cleaning liquid for a certain period of time. Thus, while the supply of the feed stock is stopped, the production is interrupted, which has been a factor of lowering the productivity.

Further, there has been a problem that, when the cleaning liquid is applied to all over the whole of the crystals which are conveyed by the flight, a part of the crystals is caused to leak in the screen part by the amount which is in proportion to that of the cleaning liquid passing through the layer of the crystals, and the amount which is in proportion to the mesh size of the screen.

Being developed in view of the problems of the prior art as mentioned above, the present invention is intended to provide a screen bowl type centrifugal separator which can not only eliminate the problem of reduction in productivity resulting from the occurrence of clogging due to the object to be treated, such as crystals, in particular, in the screen part, which is the critical portion of the screen bowl type centrifugal separator, but also minimize the amount of leakage of the object to be treated in the screen part.

DISCLOSURE OF THE INVENTION

The spirit of the present invention to achieve the above purpose is disclosed in the following items:

[3] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein a liquid conduction part for jet spouting at least a part of the cleaning liquid directly toward the residual layer crystals formed in the clearance between the outer circumferential edge of the flight of said screw conveyor and the inner circumferential surface of said screen part is provided; and the tip of at least a part of the cleaning liquid conduction part is located within 10 mm from the inner surface of the screen part.

[4] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein a residual layer crystal cleaning liquid receiving part for receiving the cleaning liquid for cleaning the residual layer object to be treated formed in the clearance between the outer circumferential edge of the flight of said screw conveyor and the inner circumferential surface of said screen part is provided inside of said cleaning liquid receiving part, being partitioned independently of the inside of said cleaning liquid receiving part; and a residual layer crystal cleaning liquid path is formed along the direction of the helix of said flight for causing the cleaning liquid inside of said residual layer crystal cleaning liquid receiving part to be directly jet spouted toward said residual layer object to be treated from the outer circumferential edge of said flight, with no relation to said cleaning liquid receiving part.

[5] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein a residual layer crystal cleaning liquid receiving part for receiving the cleaning liquid for cleaning the residual layer object to be treated formed in the clearance between the outer circumferential edge of the flight of said screw conveyor and the inner circumferential surface of said screen part is provided inside of said cleaning liquid receiving part, being partitioned independently of the inside of said cleaning liquid receiving part;

in the locations where the inner circumferential edges of said flight range, a connection tube is provided at prescribed intervals along the direction of the helix of the flight on the bottom side of said residual layer crystal cleaning liquid receiving part, and a cleaning liquid discharge hole which connect to said connection tube, being radially extended from the inner circumferential surface side of the hub to the outer circumferential edge of the flight inside the wall of the hub or the flight of said screw conveyor, is provided; and the cleaning liquid inside of said residual layer crystal cleaning liquid receiving part is directly jet spouted toward said residual layer object to be treated from the tip opening of said respective cleaning liquid discharge holes which are opened at the outer circumferential edge of said flight.

[6] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein a residual layer crystal cleaning liquid receiving part for receiving the cleaning liquid for cleaning the residual layer object to be treated formed in the clearance between the outer circumferential edge of the flight of said screw conveyor and the inner circumferential surface of said screen part is provided inside of said cleaning liquid receiving part, being partitioned independently of the inside of said cleaning liquid receiving part;

in the locations adjacent to the surface on the side opposite to the object-to-be-treated conveying surface of said flight, a connection tube is provided at prescribed intervals along the direction of the helix of said flight on the bottom side of said residual layer crystal cleaning liquid receiving part, and in the hub of said screw conveyor, a cleaning liquid connection hole to which said connection tube is connected is provided;

on the surface on the side opposite to the object-to-be-treated conveying surface of said flight, a cleaning liquid discharge pipe which is connected to said cleaning liquid connection hole, extending in the radial direction from the inner circumferential edge to the outer circumferential edge of the flight, is mounted at prescribed intervals along the direction of the helix of the flight; and the cleaning liquid inside of said residual layer crystal cleaning liquid receiving part is directly jet spouted toward said residual layer object to be treated from the tip opening of said cleaning liquid discharge pipe.

[7] The centrifugal separator of item 5, wherein, in the tip surface of the outer circumferential edge of said flight, a channel which consecutively extends along the direction of the helix of the flight, and to which the tip opening of said respective cleaning liquid discharge holes is connected is formed.

[8] The centrifugal separator of item 4, item 5, item 6, or item 7, wherein, into the inside of the hub of said screw conveyor, a feed tube for supplying the feed stock that extends in the axial direction of the hub is inserted;

a cleaning liquid supply path for supplying the cleaning liquid to the inside of said cleaning liquid receiving part is formed inside of said feed tube, and at intermediate points on the feed tube that are opposed to said cleaning liquid receiving part in the radial direction, openings of said cleaning liquid supply path are provided; and a residual layer crystal cleaning liquid supply path for supplying the cleaning liquid to the inside of said residual layer crystal cleaning liquid receiving part is formed inside of said feed tube, and at intermediate points on the feed tube that are opposed to said residual layer crystal cleaning liquid receiving part in the radial direction, openings of said residual layer crystal cleaning liquid supply path are provided.

[9] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein inside of said cleaning liquid receiving part, a plurality of residual layer crystal cleaning liquid discharge holes which are arranged at prescribed intervals along the direction of the helix of said flight in the locations adjacent to the surface on the side opposite to the object-to-be-treated conveying surface of the flight of said screw conveyor is provided;

along the outer circumferential edge of the surface on the side opposite to the object-to-be-treated conveying surface of said flight, a cover flight with a small width that extends in the direction of the helix of the flight is mounted with a prescribed spacing being given with respect to the surface on the side opposite to the object-to-be-treated conveying surface; and the cleaning liquid inside of said cleaning liquid receiving part that springs out from said residual layer crystal cleaning liquid discharge holes is directly jet spouted toward the residual layer object to be treated formed in the clearance between the outer circumferential edge of said flight and the inner circumferential surface of said screen part through the clearance between the outer circumferential edge of said flight and said cover flight.

[10] The centrifugal separator of item 9, wherein said cleaning liquid receiving part is provided with a partition plate which partitions the inside of the cleaning liquid receiving part into two or more in the axial direction in the screen part of said bowl for allowing a particular cleaning range in said screen part to be selected.

[11] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein a residual layer crystal cleaning liquid receiving part for receiving the cleaning liquid for cleaning the residual layer object to be treated formed in the clearance between the outer circumferential edge of the flight of said screw conveyor and the inner circumferential surface of said screen part is provided inside of said cleaning liquid receiving part, being partitioned independently of the inside of said cleaning liquid receiving part;

inside of the locations adjacent to the surface on the side opposite to the object-to-be-treated conveying surface of said flight, a plurality of connection tubes are provided at prescribed intervals along the direction of the helix of said flight on the bottom side of said residual layer crystal cleaning liquid receiving part, and in the hub of said screw conveyor, a plurality of residual layer crystal cleaning liquid discharge holes to which said respective connection tubes are connected, respectively, are provided;

along the outer circumferential edge of the surface on the side opposite to the object-to-be-treated conveying surface of said flight, a cover flight with a small width that extends in the direction of the helix of the flight is mounted with a prescribed spacing being given with respect to the surface on the side opposite to the object-to-be-treated conveying surface; and the cleaning liquid inside of said residual layer crystal cleaning liquid receiving part that springs out from said respective residual layer crystal cleaning liquid discharge holes is directly jet spouted toward said residual layer object to be treated through the clearance between the outer circumferential edge of said flight and said cover flight.

[12] The centrifugal separator of item 11, wherein, into the inside of the hub of said screw conveyor, a feed tube for supplying the feed stock that extends in the axial direction of the hub is inserted;

a cleaning liquid supply path for supplying the cleaning liquid to the inside of said cleaning liquid receiving part is formed inside of said feed tube, and at intermediate points on the feed tube that are opposed to said cleaning liquid receiving part in the radial direction, openings of said cleaning liquid supply path are provided; and a residual layer crystal cleaning liquid supply path for supplying the cleaning liquid to the inside of said residual layer crystal cleaning liquid receiving part is formed inside of said feed tube, and at intermediate points on the feed tube that are opposed to said residual layer crystal cleaning liquid receiving part in the radial direction, openings of said residual layer crystal cleaning liquid supply path are provided.

[13] A centrifugal separator which comprises a screw conveyor inside of a bowl, supports them so as to be relatively rotatable, separates the object to be treated from a feed stock supplied to the inside of said bowl, and carries out cleaning and deliquidization of said object to be treated with a screen part provided along the inner circumferential surface at one end of the bowl, a hub of said screw conveyor having a cleaning liquid receiving part for receiving the cleaning liquid supplied to the inside of the hub and a cleaning nozzle which jet spouts the cleaning liquid from the inside of the cleaning liquid receiving part toward said screen part, wherein inside of the hub of said screw conveyor on one side thereof, a residual layer crystal cleaning liquid receiving chamber which receives the cleaning liquid for cleaning said residual layer object to be treated formed in the clearance between the outer circumferential edge of the flight of the screw conveyor and the inner circumferential surface of said screen part is provided, being partitioned independently of said cleaning liquid receiving part;

on the outer circumference of the hub of said screw conveyor, a plurality of residual layer crystal cleaning liquid introducing tubes are arranged at prescribed intervals in the circumferential direction of the hub, being extended along the axial direction of the hub so as to penetrate through said flight, respectively, with one end of the respective residual layer crystal cleaning liquid introducing tubes being connected to the inside of said residual layer crystal cleaning liquid receiving chamber;

at intermediate points on said respective residual layer crystal cleaning liquid introducing tubes, a plurality of residual layer crystal cleaning liquid discharge holes which are arranged at prescribed intervals along the direction of the helix of the flight of said screw conveyor in the locations adjacent to the surface on the side opposite to the object-to-be-treated conveying surface of said flight are provided;

along the outer circumferential edge of the surface on the side opposite to the object-to-be-treated conveying surface of said flight, a cover flight with a small width that extends in the direction of the helix of the flight is mounted with a prescribed spacing being given with respect to the surface on the side opposite to the object-to-be-treated conveying surface; and the cleaning liquid which has been introduced into said respective residual layer crystal cleaning liquid introducing tubes from said residual layer crystal cleaning liquid receiving chamber and which springs out through said respective residual layer crystal cleaning liquid discharge holes is directly jet spouted toward said residual layer object to be treated through the clearance between the outer circumferential edge of said flight and said cover flight.

[14] The centrifugal separator of item 9, item 10, item 11, item 12, or item 13, wherein said cover flight is mounted, being provided with a slope with respect to the surface on the side opposite to the object-to-be-treated conveying surface of said flight such that the clearance is gradually narrowed down from the side closer to said hub to the side closer to the outer circumferential edge of the flight, and is mounted through supporting plates which are arranged at prescribed intervals.

Next, the function of the present invention will be described.

When the feed stock is supplied to the inside of the bowl, the centrifugal force separates the feed stock into the object to be treated and the mother liquid inside of the bowl, the object to be treated being settled onto the inner circumferential surface of the bowl, and such object to be treated is conveyed by the screw conveyor which is provided with a difference in rotational speed between it and the bowl. However, in the radial clearance formed between the outer circumferential edge of the flight of the screw conveyor and the inner circumferential surface of the screen part, the object to be treated is not sufficiently conveyed by the conveyor, forming a residual layer.

The object to be treated deliquidized on the way of being conveyed generally have impurities produced in the process of manufacture thereof, and the mother liquid itself deposited on their surfaces, and in order to remove these surplus deposited matters, at least a part of the cleaning liquid is directly jet spouted toward the residual layer crystals formed in the clearance between the outer circumferential edge of the flight of the screw conveyor and the inner circumferential surface of the screen part from the liquid conduction part in the screen part provided along the inner circumferential surface of the bowl at the one end side thereof.

Thereby, besides the whole of the object to be treated, the residual layer crystals formed in the clearance between the outer circumferential edge of the flight of the screw conveyor and the inner circumferential surface of said screen part can be directly cleaned in particular, thus no residual layer crystals are anchored, resulting in the movability being enhanced, and the penetrability of the cleaning liquid through the whole of the object to be treated during conveying being improved. Therefore, clogging with the object to be treated in the screen part can be prevented; the amount of the cleaning liquid as that for substitution of the impurities in the object to be treated, which is the original application, can be minimized; and the amount of leakage of the object to be treated in the screen part can be minimized.

At least a part of the cleaning liquid is directly jet spouted toward the residual layer crystals formed in the clearance between the outer circumferential edge of the flight of the screw conveyor and the inner circumferential surface of the screen part from the liquid conduction part. Because said liquid conduction part is provided such that the thickness of the residual layer crystals is held to within 10 mm by the penetration of the cleaning liquid jet spouted from the liquid conduction part, the cleaning liquid effectively passes through the residual layer crystals, which allows the amount of leakage of the object to be treated in the screen part to be more effectively reduced.

According to the centrifugal separator as defined in said [3], at least a part of the cleaning liquid is directly jet spouted toward the residual layer crystals formed in the clearance between the outer circumferential edge of the flight of the screw conveyor and the inner circumferential surface of the screen part from the liquid conduction part. Because the tip of at least a part of the cleaning liquid conduction part is located within 10 mm from the inner surface of the screen part, the cleaning liquid effectively passes through the residual layer crystals, which makes it possible to more effectively reduce the amount of leakage of the object to be treated in the screen part.

According to the centrifugal separator as defined in said [4], when the feed stock is supplied to the inside of the bowl, the centrifugal force separates the feed stock into the object to be treated and the mother liquid inside of the bowl, the object to be treated being settled onto the inner circumferential surface of the bowl, and such object to be treated is conveyed by the screw conveyor which is provided with a difference in rotational speed between it and the bowl. However, in the radial clearance formed between the outer circumferential edge of the flight of the screw conveyor and the inner circumferential surface of the screen part, the object to be treated is not sufficiently conveyed by the conveyor, forming a residual layer.

The object to be treated deliquidized on the way of being conveyed generally have impurities produced in the process of manufacture thereof, and the mother liquid itself deposited on their surfaces, and in order to remove these surplus deposited matters, the cleaning liquid is jet spouted toward the object to be treated from the cleaning nozzle provided in the hub of the screw conveyor for carrying out cleaning in the screen part provided along the inner circumferential surface of the bowl at the one end side thereof. The cleaning liquid mentioned here is supplied to the inside of the cleaning liquid receiving part provided inside of said hub through the cleaning liquid supply path separately provided inside of the feed tube for supplying the feed stock to the inside of the bowl, for example.

Inside of said cleaning liquid receiving part, a residual layer crystal cleaning liquid receiving part for receiving the cleaning liquid for cleaning the residual layer of said object to be treated is provided, being partitioned independently of the inside of the cleaning liquid receiving part, and the cleaning liquid supplied to the inside of this residual layer crystal cleaning liquid receiving part is directly jet spouted toward the residual layer object to be treated from the outer circumferential edge of the flight through the residual layer crystal cleaning liquid path formed along the direction of the helix of the flight, with no relation to said cleaning liquid receiving part. Thereby, the cleaning of the object to be treated by the cleaning nozzle and the cleaning of the residual layer object to be treated by the residual layer crystal cleaning liquid path can be separately performed, which allows the respective cleaning liquids to be rendered different from each other in type and amount of liquid.

Thus, besides the whole of the object to be treated, the residual layer object to be treated formed in the clearance between the outer circumferential edge of the flight of said screw conveyor and the inner circumferential surface of said screen part can be directly cleaned in particular, thus no residual layer object to be treated is anchored, resulting in the movability being enhanced, and the penetrability of the cleaning liquid through the whole of the object to be treated during conveying being improved. Therefore, clogging with the object to be treated in the screen part can be prevented; the amount of the cleaning liquid as that for substitution of the impurities in the object to be treated, which is the original application, can be minimized; and the amount of leakage of the object to be treated in the screen part can be minimized.

According to the centrifugal separator as defined in said [5], the cleaning liquid inside of said residual layer crystal cleaning liquid receiving part springs out into the inside of the bowl from the cleaning liquid discharge holes provided in the wall of the hub or the flight of said screw conveyor, being passed through the connection tubes disposed at prescribed intervals along the direction of the helix of the flight in the locations where the inner circumferential edges of the flight range. The cleaning liquid discharge holes are radially extended from the inner circumferential surface side of the hub to the outer circumferential edge of the flight, allowing the cleaning liquid to be directly jet spouted toward said residual layer object to be treated from the tip opening of said respective cleaning liquid discharge holes which are opened at the outer circumferential edge of the flight.

Herein, if, as with the centrifugal separator as defined in said [7], a channel which consecutively extends along the direction of the helix of said flight, and to which the tip opening of said respective cleaning liquid discharge holes is connected is formed in the tip surface of the outer circumferential edge of the flight, the cleaning liquid from the tip opening of said respective cleaning liquid discharge holes is spread throughout the entire area of the outer circumferential edge of the flight along the channel, and can be directly jet spouted toward said residual layer object to be treated such that the cleaning liquid is spread over the entire circumference in the radial direction.

According to the centrifugal separator as defined in said [6], the cleaning liquid inside of said residual layer crystal cleaning liquid receiving part passes through the connection tubes which are provided at prescribed intervals along the direction of the helix of said flight in the locations adjacent to the surface on the side opposite to the object-to-be-treated conveying surface of the flight, and the cleaning liquid connection holes provided in the wall of the hub of said screw conveyor, being introduced into the cleaning liquid discharge pipes which are provided at prescribed intervals along the direction of the helix of said flight on the surface on the side opposite to the object-to-be-treated conveying surface of the flight.

The respective cleaning liquid discharge pipes extend radially from the inner circumferential edge to the outer circumferential edge of the flight, and from the tip opening of the respective cleaning liquid discharge pipes disposed along the outer circumferential edge of the flight, the cleaning liquid can be directly jet spouted toward said residual layer object to be treated. According to such a configuration, the need for work to provide holes in the flight itself is eliminated, and the cleaning liquid discharge pipes can be post-attached to the flight, which allows the manufacture to be carried out relatively easily.

Further, in order to supply the cleaning liquid to the inside of said cleaning liquid receiving part and the inside of said residual layer crystal cleaning liquid receiving part provided inside of the hub of said screw conveyor, a part of the feed tube for supplying the feed stock that is also inserted into the inside of the hub can be effectively used, as with the centrifugal separator as defined in said [8].

In other words, a cleaning liquid supply path for supplying the cleaning liquid to the inside of said cleaning liquid receiving part is formed inside of the feed tube, and at intermediate points on the feed tube that are opposed to said cleaning liquid receiving part in the radial direction, openings of the cleaning liquid supply path are provided.

Similarly, a residual layer crystal cleaning liquid supply path for supplying the cleaning liquid to the inside of said residual layer crystal cleaning liquid receiving part is formed inside of the feed tube, and at intermediate points on the feed tube that are opposed to said residual layer crystal cleaning liquid receiving part in the radial direction, openings of the residual layer crystal cleaning liquid supply path are provided. Thereby, the cleaning liquid can be separately and effectively supplied to the inside of the cleaning liquid receiving part and the inside of the residual layer crystal cleaning liquid receiving part.

According to the centrifugal separator as defined in said [9], when the feed stock is supplied to the inside of the bowl, the centrifugal force separates the feed stock into the object to be treated and the mother liquid inside of the bowl, the object to be treated being settled onto the inner circumferential surface of the bowl, and such object to be treated is conveyed by the screw conveyor which is provided with a difference in rotational speed between it and the bowl. However, in the radial clearance formed between the outer circumferential edge of the flight of the screw conveyor and the inner circumferential surface of the screen part, the object to be treated is not sufficiently conveyed by the conveyor, forming a residual layer.

The object to be treated deliquidized on the way of being conveyed generally have impurities produced in the process of manufacture thereof, and the mother liquid itself deposited on their surfaces, and in order to remove these surplus deposited matters, the cleaning liquid is directly jet spouted toward the object to be treated from the cleaning nozzle provided in the hub of the screw conveyor for carrying out cleaning in the screen part provided along the inner circumferential surface of the bowl at the one end side thereof. The cleaning liquid mentioned here is supplied to the inside of the cleaning liquid receiving part provided inside of said hub through the cleaning liquid supply path separately provided inside of the feed tube for supplying the feed stock to the inside of the bowl, for example.

The cleaning liquid inside of said cleaning liquid receiving part is not only jet spouted from said cleaning nozzle, but also springs out into the inside of the bowl from the plurality of residual layer crystal cleaning liquid discharge holes which are arranged at prescribed intervals along the direction of the helix of said flight in the locations adjacent to the surface on the side opposite to the object-to-be-treated conveying surface of the flight. Herein, the cleaning liquid is directly jet spouted toward the residual layer object to be treated through the small clearance between the cover flight with a small width that extends in the direction of the helix of the flight with a prescribed spacing being given with respect to the surface on the side opposite to the object-to-be-treated conveying surface of the flight along the outer circumferential edge of the surface on the side opposite to the object-to-be-treated conveying surface of the flight, and the outer circumferential edge of the flight, without being scattered.

Thereby, besides cleaning of the whole of the object to be treated by means of the cleaning nozzles, the residual layer object to be treated can be locally cleaned as well in particular, thus no residual layer object to be treated is anchored, resulting in the movability being enhanced, and the penetrability of the cleaning liquid through the whole of the object to be treated during conveying being improved. Therefore, clogging with the object to be treated in the screen part can be prevented; the amount of the cleaning liquid as that for substitution of the impurities in the object to be treated, which is the original application, can be minimized; and the amount of leakage of the object to be treated in the screen part can be minimized.

As with the centrifugal separator as defined in said [10], when said cleaning liquid receiving part is provided with a partition plate which partitions the inside of the cleaning liquid receiving part into two or more in the axial direction in the screen part of said bowl, the cleaning liquid may be supplied to the inside of all the compartments of said cleaning liquid receiving part through the cleaning liquid supply path separately provided inside of the feed tube for supplying the feed stock to the inside of the bowl, or the cleaning liquid may be supplied to the inside of only a part of the compartments, for example.

In such a case, the cleaning liquid is jet spouted toward the screen part only in the range where it is opposed, in the radial direction of the bowl, to the inside of the compartment of the cleaning liquid receiving part to which the cleaning liquid has been supplied. Thereby, the cleaning range in the screen part can be selected as appropriate.

According to the centrifugal separator as defined in said [11], a residual layer crystal cleaning liquid receiving part for receiving the cleaning liquid for cleaning the residual layer of the object to be treated is provided inside of said cleaning liquid receiving part, being partitioned independently of the inside of the cleaning liquid receiving part, and the cleaning liquid which has been supplied to the inside of this residual layer crystal cleaning liquid receiving part passes through the connection tubes which are provided at prescribed intervals along the direction of the helix of said flight in the locations adjacent to the surface on the side opposite to the object-to-be-treated conveying surface of the flight, and springs out from the residual layer crystal cleaning liquid discharge holes provided in the wall of the hub of said screw conveyor.

The cleaning liquid which has sprung out into the inside of the bowl can be directly jet spouted toward said residual layer object to be treated through the small clearance between the cover flight with a small width that extends in the direction of the helix of said flight along the outer circumferential edge of the surface on the side opposite to the object-to-be-treated conveying surface of the flight, and the outer circumferential edge of the flight, without being scattered. Thereby, as with the centrifugal separator as defined in said [9], the penetrability of the cleaning liquid through the object to be treated, and the movability of the residual layer object to be treated can be enhanced.

Further, with the present centrifugal separator, in order to supply the cleaning liquid to the inside of the cleaning liquid receiving part and the inside of the residual layer crystal cleaning liquid receiving part provided inside of the hub of said screw conveyor, a part of the feed tube for supplying the feed stock that is inserted into the inside of the hub can be effectively used, as mentioned in said [12].

In other words, a cleaning liquid supply path for supplying the cleaning liquid to the inside of said cleaning liquid receiving part is formed inside of the feed tube, and at intermediate points on the feed tube that are opposed to said cleaning liquid receiving part in the radial direction, openings of the cleaning liquid supply path are provided.

Similarly, a residual layer crystal cleaning liquid supply path for supplying the cleaning liquid to the inside of said residual layer crystal cleaning liquid receiving part is formed inside of the feed tube, and at intermediate points on the feed tube that are opposed to said residual layer crystal cleaning liquid receiving part in the radial direction, openings of the residual layer crystal cleaning liquid supply path are provided. Thereby, the cleaning liquid can be separately and effectively supplied to the inside of the cleaning liquid receiving part and the inside of the residual layer crystal cleaning liquid receiving part.

According to the centrifugal separator as defined in said [13], a residual layer crystal cleaning liquid receiving chamber which receives the cleaning liquid for cleaning the residual layer of the object to be treated is provided inside of said hub on one side thereof independently of said cleaning liquid receiving part, and the cleaning liquid which has been supplied to the inside of this residual layer crystal cleaning liquid receiving chamber is introduced into the respective plurality of residual layer crystal cleaning liquid introducing tubes arranged on the outer circumference of the hub.

And, the cleaning liquid which has been introduced into the respective residual layer crystal cleaning liquid introducing tubes passes through the respective plurality of residual layer crystal cleaning liquid discharge holes which are provided at prescribed intervals at intermediate points on the respective residual layer crystal cleaning liquid introducing tubes, springing out into the inside of the bowl. The cleaning liquid which has sprung out can be directly jet spouted toward said residual layer object to be treated through the small clearance between the cover flight with a small width that extends in the direction of the helix of said flight along the outer circumferential edge of the surface on the side opposite to the object-to-be-treated conveying surface of the flight, and the outer circumferential edge of the flight. Thereby, as with the centrifugal separator as defined in said [9] and [11], the penetrability of the cleaning liquid through the object to be treated, and the movability of the residual layer object to be treated can be enhanced.

Further, if, as with the centrifugal separator as defined in said [14], said cover flight is mounted, being provided with a slope with respect to the surface on the side opposite to the object-to-be-treated conveying surface of said flight such that the clearance is gradually narrowed down from the side closer to said hub to the side closer to the outer circumferential edge of the flight, and is mounted through supporting plates which are arranged at prescribed intervals, the cleaning liquid which springs out from said hub side can be received in a wide span, and the received cleaning liquid can be directly jet spouted toward the residual layer object to be treated from a narrow span.

BEST MODE FOR CARRYING OUT THE INVENTION

Hereinbelow, various exemplary embodiments of the present invention will be described with reference to the drawings.

Figure 1:
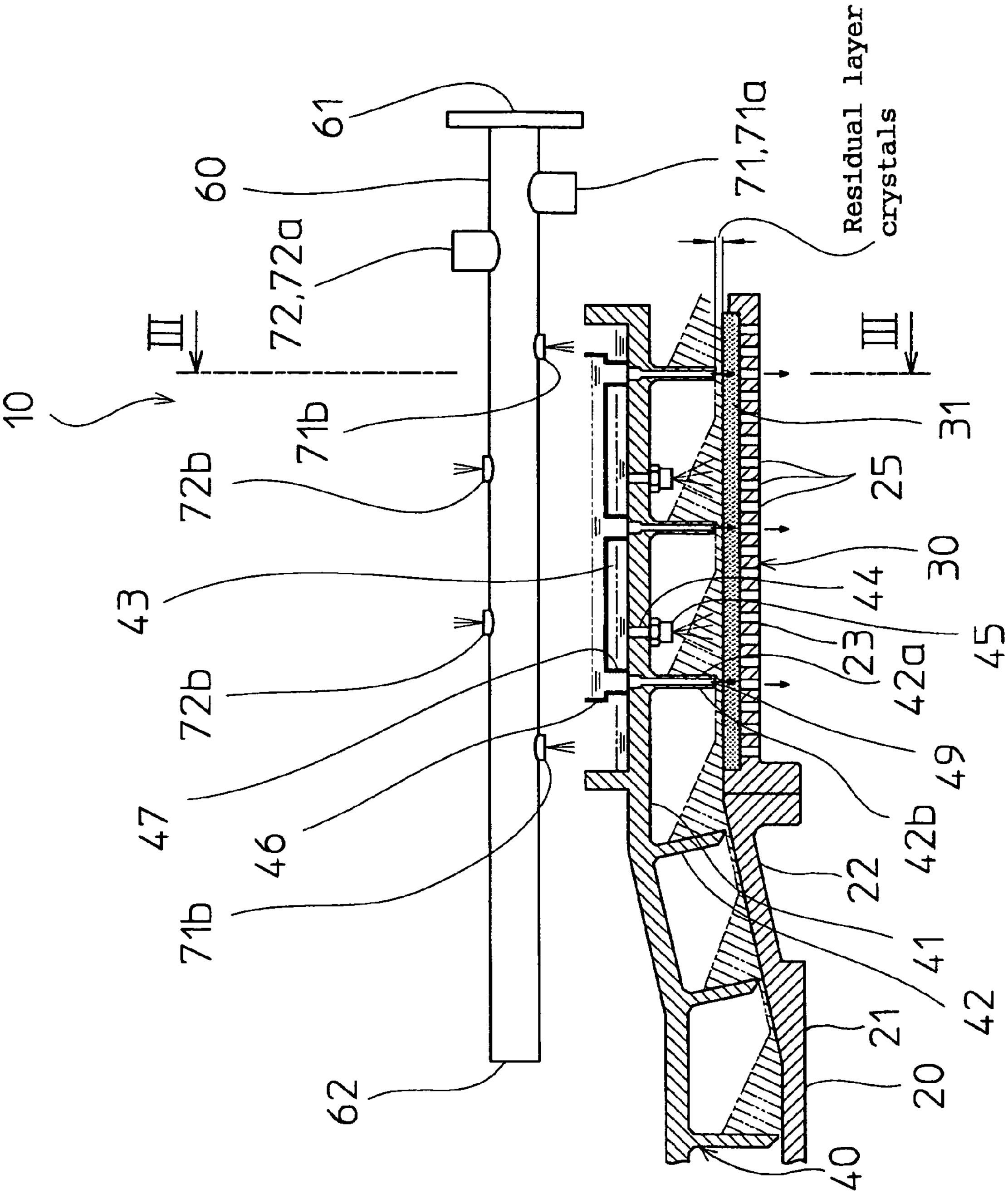
FIG. 1 is a longitudinal sectional view illustrating the critical portion of a centrifugal separator according to a first embodiment of the present invention.
Figure 2:
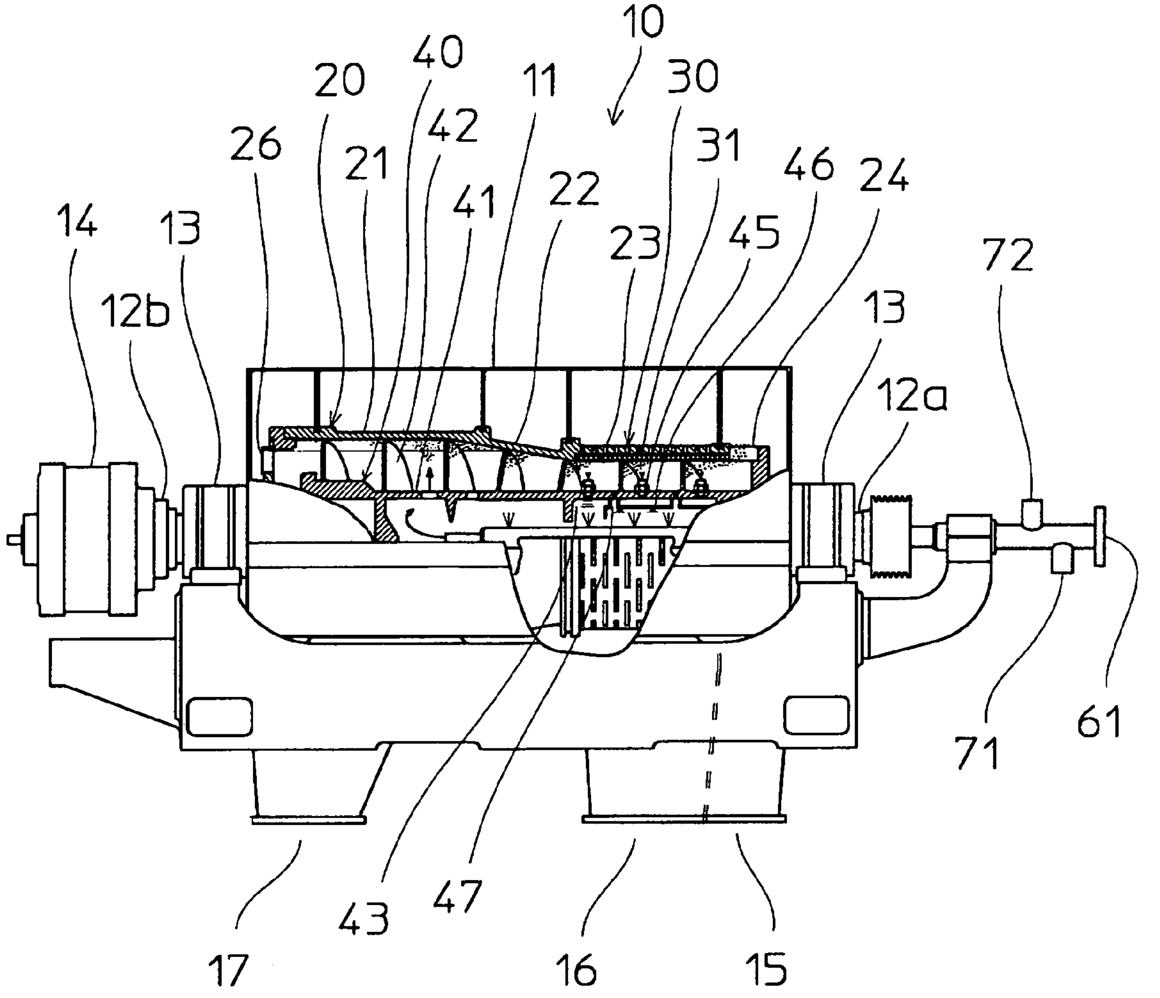
FIG. 2 is a longitudinal sectional view illustrating the whole of a centrifugal separator according to a first embodiment of the present invention.
Figure 3:
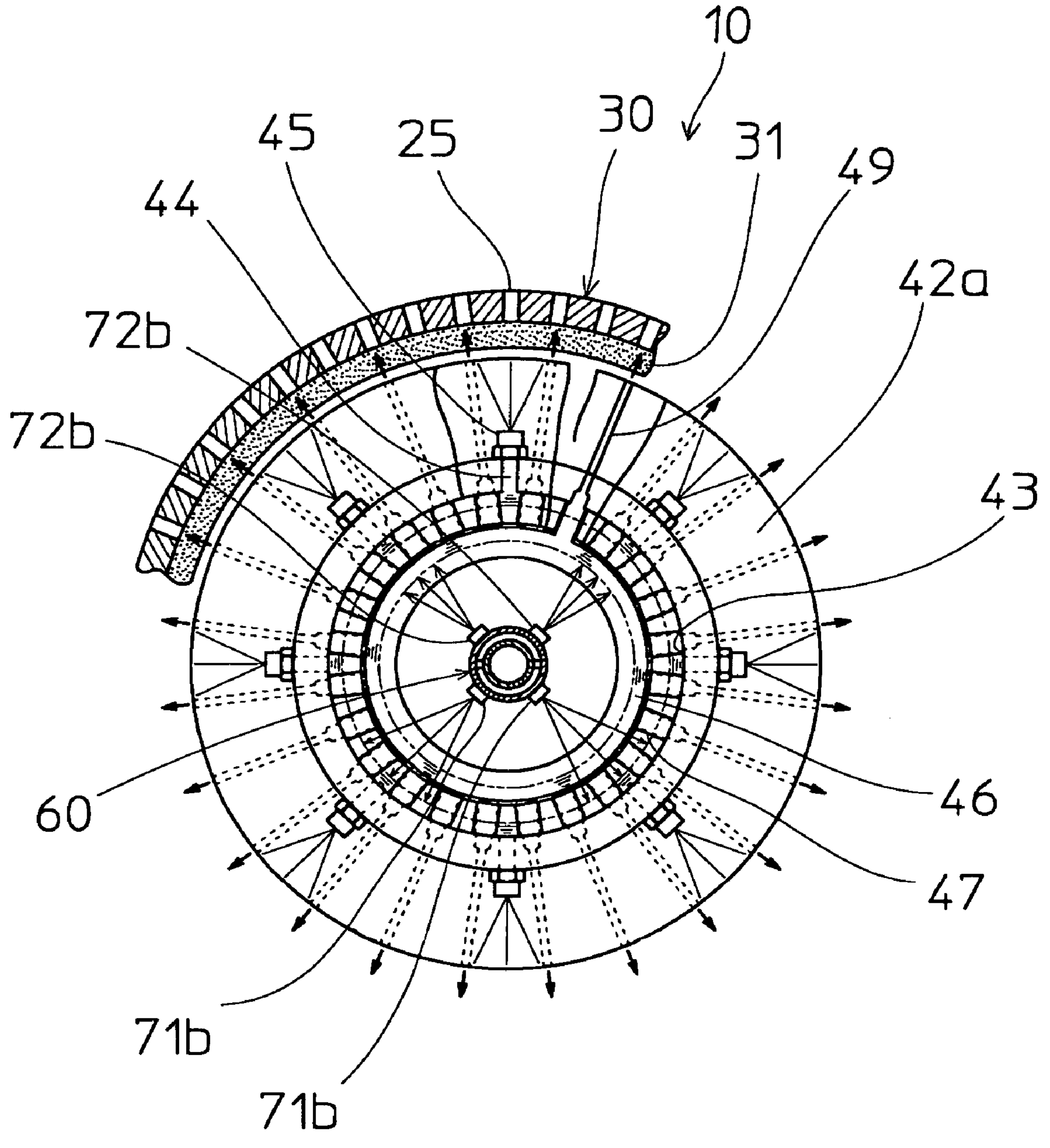
FIG. 3 is a sectional view taken along the line III—III in FIG. 1.

FIG. 1 to FIG. 3 show a first embodiment of the present invention.

A centrifugal separator 10 according to the present embodiment is a so-called screen bowl type centrifugal separator, comprising a screw conveyor 40 inside of a substantially cylindrical type bowl 20, and supporting the screw conveyor 40 and the bowl 20 such that these are relatively rotatable, and is configured such that a feed stock supplied to the inside of said bowl 20 can be separated into the object to be treated and the mother liquid.

Herein, the object to be treated refers to a variety of crystals, and the like in the chemical industry and the food industry, and particularly, refers to, for example, terephthalic acid, which is a raw material for PET bottles and polyester fabrics, paraxylene, which is a raw material for terephthalic acid, bisphenol, which is a raw material for CD-ROM, monosodium glutamate, which is a raw material for chemical seasonings, and the like. The mother solution refers to various solvents. With the variety of crystals, unpolymerized substances and the solvent constituting the slurry have deposited on their surfaces in the manufacturing process, and these deposited matters can be cleaning-substituted by the cleaning liquid (a specific other solvent, or the like). Hereinbelow, the present embodiment will be described when it is applied to crystals as an object to be treated.

As shown in FIG. 2, the bowl 20 and the screw conveyor 40 inside thereof are rotatably pivotally supported inside of a casing 11 through shafts 12*a*, 12*b*. The bowl 20 and the screw conveyor 40 are rotation-driven with a minute difference in speed by a differential gear 14 connected to a bearing 13 on one side. Such a differential gear 14 itself is well known, and thus detailed description is omitted.

The inside of the casing 11 is partitioned for providing a later described discharge port 24 provided for the bowl 20, a screen part 30, a dam part 26, and the like, respectively. And, under the casing 11, a crystal discharge port 15 connected to said discharge port 24, a cleaning liquid discharge port 16 connected to said screen part 30, and a mother liquid discharge port 17 connected to said dam part 26 are provided, respectively.

One end side (the right side in FIG. 2) of the bowl 20 provides the direction along which crystals are discharged, and from the other end side (the left side in FIG. 2) of the bowl 20, the bowl is partitioned into a parallel cylinder part 21 with a larger diameter, a tapered part 22 which inside diameter is gradually reduced toward the one end, and a parallel cylinder part 23 with a smaller diameter, in this order. On the end side of the parallel cylinder part 23 with a smaller diameter, a crystal discharge port 24 is formed, and on the end side of the parallel cylinder part 21 with a larger diameter, a dam part 26 which regulates the liquid level measured along the radial direction of the bowl 20, and is capable of discharging the mother liquid after the crystals having been separated, to the outside of the bowl 20 is provided.

As shown in FIG. 1, the parallel cylinder part 23 with a smaller diameter has a number of filtered liquid discharge holes 25 formed in the wall surface, and is covered with a cylindrical filtering medium 31 over the entire circumference on the inner circumference side, thus providing the screen part 30. For the size of the filtered liquid discharge hole 25, there is no need for much consideration about the diameter of the crystal particles, but the filtering medium 31 is made of a material having a number of minute holes or slits which diameter or size is smaller than the particle diameter of the crystals. Specifically, a wedge wire screen, a porous ceramic molding, or the like, may be used, for example. The inner circumferential surface of the parallel cylinder part 23 is cut by the depth equivalent to the thickness of the filtering medium 31.

The screw conveyor 40 is made up of a hub 41 which provides an axis of rotation therefor, and a flight 42 which is provided in the form of a screw on the outer circumference of the hub 41, and the flight 42 is formed such that the crystals are conveyed toward the one end side (the right side in FIG. 2) of the bowl 20. Between the outer circumferential edge of the flight 42 and the inner circumferential surface of the parallel cylinder part 23 (the surface of the filtering medium 31 of the screen part 30), a clearance in the radial direction is provided because the screw conveyor 40 and the bowl 20 are constructed to be rotated at different speeds.

The hub 41 is provided with a cleaning liquid receiving part 43 which receives the cleaning liquid supplied to the inside of the hub 41, and a cleaning nozzle 45 which jet spouts the cleaning liquid from the inside of the cleaning liquid receiving part 43 toward the screen part 30 of said bowl 20. The cleaning liquid receiving part 43 is made up of a portion which is surrounded by a partition extending by a prescribed width in the axial direction around the entire circumference of the inner circumferential surface of the hub 41.

In the circumferential wall of the hub 41 that provides the bottom side of the cleaning liquid receiving part 43, a cleaning liquid connection hole 44 is provided at prescribed intervals, and on the outer circumferential surface side of the hub 41, a cleaning nozzle 45 which is connected to said cleaning liquid connection hole 44 is protruded. Herein, the cleaning nozzle 45 is disposed slightly toward the other side (the left side in FIG. 1) off the pitch center of the flight 42 and in a location where it is opposed to the screen part 30 in the radial direction, as shown in FIG. 1.

Further, inside of the cleaning liquid receiving part 43, a residual layer crystal cleaning liquid receiving part 46 which receives the cleaning liquid for cleaning the residual layer crystals formed in the clearance between the outer circumferential edge of the flight 42 and the inner circumferential surface of the screen part 30 is provided, being partitioned independently of the inside of the cleaning liquid receiving part 43. The residual layer crystal cleaning liquid receiving part 46 is formed by providing a partition which extends by a prescribed width in the axial direction at both ends of a cylindrical member over the entire circumference thereof, and on the bottom side, a connection tube 47 is protruded at prescribed intervals, the respective connection tubes 47 causing the residual layer crystal cleaning liquid receiving part 46 to be fixedly installed with a separation from the inner circumferential surface of the hub 41 inside of said cleaning liquid receiving part 43. As shown in FIG. 1, the respective connection tubes 47 are disposed at prescribed intervals along the direction of the helix of said flight 42 in the locations where the inner circumferential edges of the flight 42 range.

In the present embodiment, a plurality of cleaning liquid discharge holes 49 which connect to said respective connection tubes 47 are provided, being radially extended from the inner circumferential surface side of the hub 41 to the outer circumferential edge of the flight 42 inside the wall of the hub 41 or the flight 42 in the locations where the inner circumferential edges of the flight 42 of the screw conveyor 40 range. The respective cleaning liquid discharge holes 49 provide a residual layer crystal cleaning liquid path together with the respective connection tubes 47 for causing the cleaning liquid inside of said residual layer crystal cleaning liquid receiving part 46 to be directly jet spouted toward the residual layer crystals on the screen part 30 from the outer circumferential edge of the flight 42, with no relation to said cleaning liquid receiving part 43.

The cleaning nozzle 45 which is connected to the cleaning liquid connection hole 44 and the plurality of cleaning liquid discharge holes 49 constitute a liquid conduction part for causing at least a part of the cleaning liquid to be directly jet spouted toward the residual layer crystals formed in the clearance between the outer circumferential edge of the flight 42 of said screw conveyor 40 and the inner circumferential surface of said screen part 30. And, the tips of the plurality of cleaning liquid discharge holes 49 to which the respective connection tubes 47 are connected, and which are at least a part of the cleaning liquid conduction part are located within 10 mm from the inner surface of the screen part 30. In addition, said liquid conduction part is provided such that the thickness of the residual layer crystals is held to within 10 mm by the penetration of at least a part of the jet spouted cleaning liquid.

Into the inside of the hub 41, a feed tube 60 for supplying the feed stock that extends in the axial direction of the hub 41 is inserted. The starting end of the feed tube 60 extends out beyond the hub 41 and the bowl 20, providing a feed stock supply port 61, and the terminating end of the feed tube 60 is disposed substantially at the center of the inside of the hub 41, providing a feed stock outlet port 62. Further, into the inside of the feed tube 60, a cleaning liquid supply tube 71 providing a cleaning liquid supply path for supplying the cleaning liquid to the inside of said cleaning liquid receiving part 43, and a residual layer crystal cleaning liquid supply tube 72 providing a residual layer crystal cleaning liquid supply path for supplying the cleaning liquid to the inside of said residual layer crystal cleaning liquid receiving part 46 are inserted.

The starting end of the cleaning liquid supply tube 71 provides a cleaning liquid supply port 71*a* which opens substantially at right angles to the axial direction on the starting end side of the feed tube 60. In addition, at intermediate points on the feed tube 60 that are opposed to the cleaning liquid receiving part 43 in the radial direction inside of the hub 41, openings 71*b* of the cleaning liquid supply tube 71 are opened substantially at right angles to the axial direction. On the other hand, the starting end of the residual layer crystal cleaning liquid supply tube 72 provides a residual layer crystal cleaning liquid supply port 72*a* which opens substantially at right angles to the axial direction on the starting end side of the feed tube 60. In addition, at intermediate points on the feed tube 60 that are opposed to the residual layer crystal cleaning liquid receiving part 46 in the radial direction inside of the hub 41, openings 72*b* of the residual layer crystal cleaning liquid supply tube 72 are opened substantially at right angles to the axial direction.

Next, the function of the centrifugal separator 10 according to the first embodiment will be described.

In FIG. 1 and FIG. 2, the feed stock is supplied to the inside of the bowl 20 through the feed tube 60 by use of a pump or other driving source. The feed stock which is fed from the feed stock supply port 61 comes from the feed stock outlet port 62 located substantially in the vicinity of the center inside of the hub 41 of the screw conveyor 40, filling the bowl 20 to a prescribed level which is preset by the dam part 26 inside of the bowl 20. The feed stock is subjected to the action of the centrifugal force inside of the bowl 20, resulting in the crystals being settled to be separated from the mother liquid.

The crystals settled onto the inner circumferential surface of the bowl 20 by the action of the centrifugal force are conveyed to the tapered part 22 of the bowl 20 by the flight 42 of the screw conveyor 40 which is rotated at a speed slightly different from that of the bowl 20, and are deliquidized while being moved on the inner circumferential surface of the tapered part 22, being brought closer to the axis than the liquid level preset by the dam part 26, before further being conveyed to the screen part 30.

The crystals deliquidized on the way of being conveyed have impurities produced in the process of manufacture thereof, and the mother liquid itself deposited on their surfaces, and the crystals which have reached the screen part 30 are cleaned by the cleaning liquid jet spouted from the cleaning nozzle 45 provided in the hub 41. As the cleaning liquid, pure water, acetic acid solution, pure phenol solution, sulfuric acid solution, hydrochloric acid solution, or the like is generally used, and the cleaning liquid is supplied to the inside of the cleaning liquid receiving part 43 provided inside of the hub 41 through the cleaning liquid supply tube 71 which is separately inserted into the feed tube 60. The cleaning liquid received by the cleaning liquid receiving part 43 is passed through the cleaning liquid connection hole 44 in the circumferential wall of the hub 41 before being jet spouted from the cleaning nozzle 45.

The crystals are thus subjected to cleaning and deliquidization in the screen part 30, and further conveyed toward the discharge port 24, however, in the clearance between the outer circumferential edge of the flight 42 of the screw conveyor 40 and the inner circumferential surface of the screen part 30, a residual layer of crystals is formed. Such residual layer crystals are directly and locally cleaned by the cleaning liquid which is jet spouted from the outer circumferential edge of the flight 42 through the residual layer crystal cleaning liquid path, with no relation to said cleaning liquid receiving part 43. The cleaning liquid used here is often the same as that which is jet spouted from said cleaning nozzle 45, and is supplied to the inside of the residual layer crystal cleaning liquid receiving part 46 provided inside of the hub 41 through the residual layer crystal cleaning liquid supply tube 72 which is separately inserted into the feed tube 60.

In details, the cleaning liquid inside of the residual layer crystal cleaning liquid receiving part 46 is jet spouted into the inside of the bowl 20 from the cleaning liquid discharge holes 49 provided inside the wall of the hub 41 or said flight 42, being passed through the connection tubes 47 disposed at prescribed intervals along the direction of the helix of the flight 42 in the locations where the inner circumferential edges of the flight 42 range. The cleaning liquid discharge holes 49 are radially extended from the inner circumferential surface side of the hub 41 to the outer circumferential edge of the flight 42, allowing the cleaning liquid to be directly jet spouted toward the residual layer crystals from the tip opening of the respective cleaning liquid discharge holes 49 which are opened at the outer circumferential edge of the flight 42.

As described above, besides cleaning of the whole of the crystals by means of the cleaning nozzles 45, the residual layer crystals can be locally and directly cleaned in particular by means of the residual layer crystal cleaning paths, thus no residual layer crystals are anchored, resulting in the movability being enhanced, and the penetrability of the cleaning liquid through the whole of the crystals during conveying being improved. Therefore, crystal clogging in the screen part 30 can be prevented; the amount of the cleaning liquid as that for substitution of the impurities in the crystals, which is the original application, can be minimized; and the amount of leakage of the crystals in the screen part 30 can be minimized.

Moreover, the cleaning liquid is separately supplied to the inside of the cleaning liquid receiving part 43 and the residual layer crystal cleaning liquid receiving part 46, which are partitioned from each other, thus the amount of the cleaning liquid which is jet spouted from the cleaning nozzles 45 and the amount of the cleaning liquid which is jet spouted from the residual layer crystal cleaning liquid path can be separately controlled from the external, which allows both amounts of the cleaning liquid to be easily adjusted to be set at an optimum value, respectively, for minimization of the substitution rate for crystal cleaning and the amount of leakage.

In the screen part 30, the cleaning liquid which has been jet spouted from the cleaning nozzle 45 and the residual layer crystal cleaning liquid path is passed through the filtering medium 31 after cleaning the crystals and the residual layer crystals, and is discharged from the filtered liquid discharge holes 25 to the outside of the bowl 20. The crystals which have been cleaned and deliquidized in the screen part 30 are discharged from the discharge port 24 to the outside of the bowl 20, and finally recovered from the crystal discharge port 15 provided in the casing 11.

Thus, when the feed stock is supplied to the inside of the bowl 20, the centrifugal force separates the feed stock into the object to be treated and the mother liquid inside of the bowl 20, the object to be treated being settled onto the inner circumferential surface of the bowl 20, and such object to be treated is conveyed by the screw conveyor 40 which is provided with a difference in rotational speed between it and the bowl 20. However, in the radial clearance formed between the outer circumferential edge of the flight 42 of the screw conveyor 40 and the inner circumferential surface of the screen part 30, the object to be treated is not sufficiently conveyed by the conveyor, forming a residual layer.

The object to be treated deliquidized on the way of being conveyed generally have impurities produced in the process of manufacture thereof, and the mother liquid itself deposited on their surfaces, and in order to remove these surplus deposited matters, at least a part of the cleaning liquid is directly jet spouted toward the residual layer crystals formed in the clearance between the outer circumferential edge of the flight 42 of the screw conveyor 40 and the inner circumferential surface of the screen part 30 from the liquid conduction part in the screen part 30 provided along the inner circumferential surface of the bowl 20 at the one end side thereof.

Thereby, besides the whole of the object to be treated, the residual layer crystals formed in the clearance between the outer circumferential edge of the flight 42 of the screw conveyor 40 and the inner circumferential surface of said screen part 30 can be directly cleaned in particular, thus no residual layer crystals are anchored, resulting in the movability being enhanced, and the penetrability of the cleaning liquid through the whole of the object to be treated during conveying being improved. Therefore, clogging with the object to be treated in the screen part 30 can be prevented; the amount of the cleaning liquid as that for substitution of the impurities in the object to be treated, which is the original application, can be minimized; and the amount of leakage of the object to be treated in the screen part 30 can be minimized.

Said liquid conduction part is provided such that, when at least a part of the cleaning liquid is directly jet spouted toward the residual layer crystals formed in the clearance between the outer circumferential edge of the flight 42 of the screw conveyor 40 and the inner circumferential surface of the screen part 30 from the liquid conduction part, the thickness of the residual layer crystals is held to within 10 mm by the penetration of the cleaning liquid jet spouted from the liquid conduction part, thus the cleaning liquid effectively passes through the residual layer crystals, which allows the amount of leakage of the object to be treated in the screen part 30 to be more effectively reduced. In addition, the tip of at least a part of the cleaning liquid conduction part is located within 10 mm from the inner surface of the screen part 30, thus the cleaning liquid effectively passes through the residual layer crystals, which makes it possible to more effectively reduce the amount of leakage of the object to be treated in the screen part 30.

Figure 4:
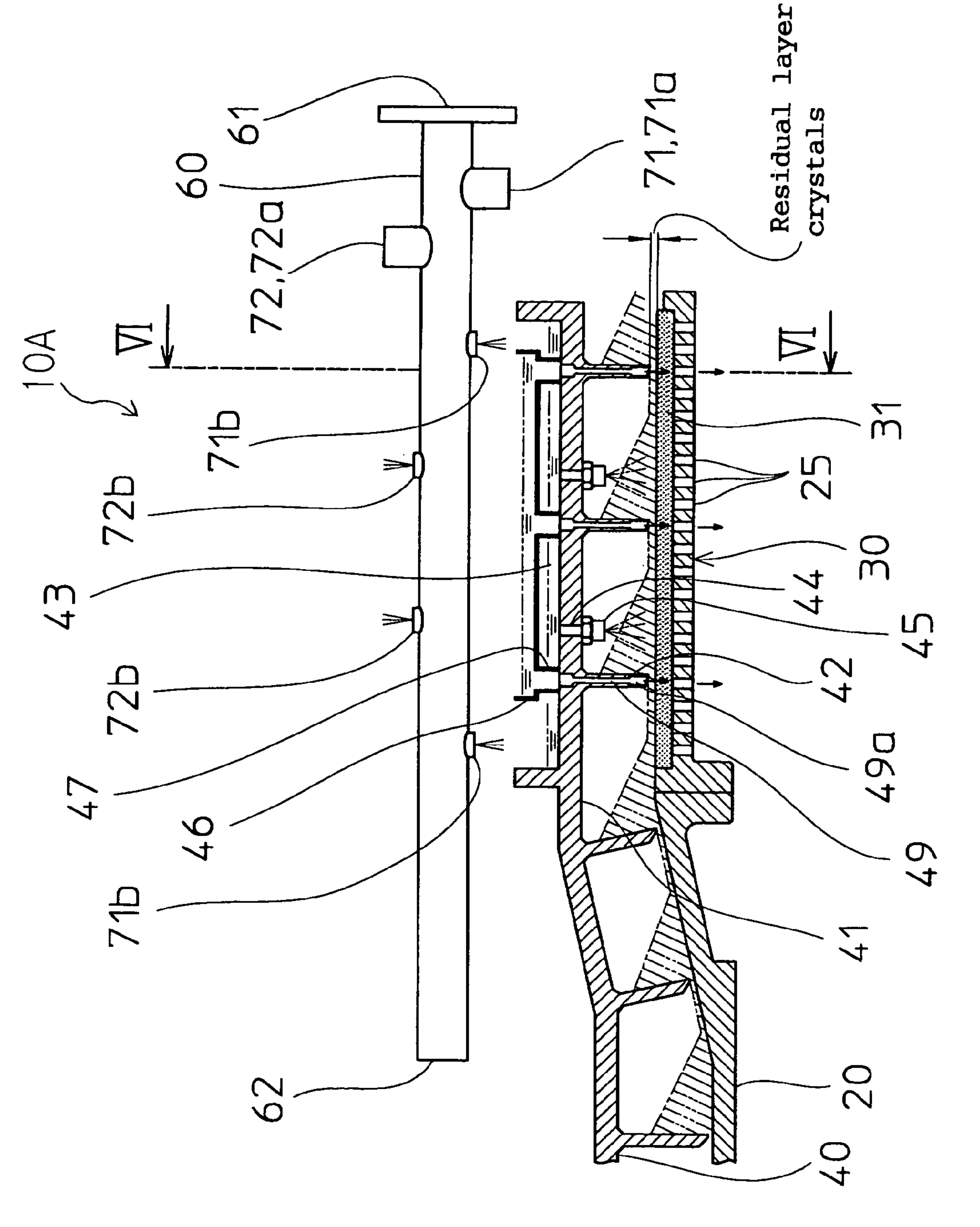
FIG. 4 is a longitudinal sectional view illustrating the critical portion of a centrifugal separator according to a second embodiment of the present invention.
Figure 5:
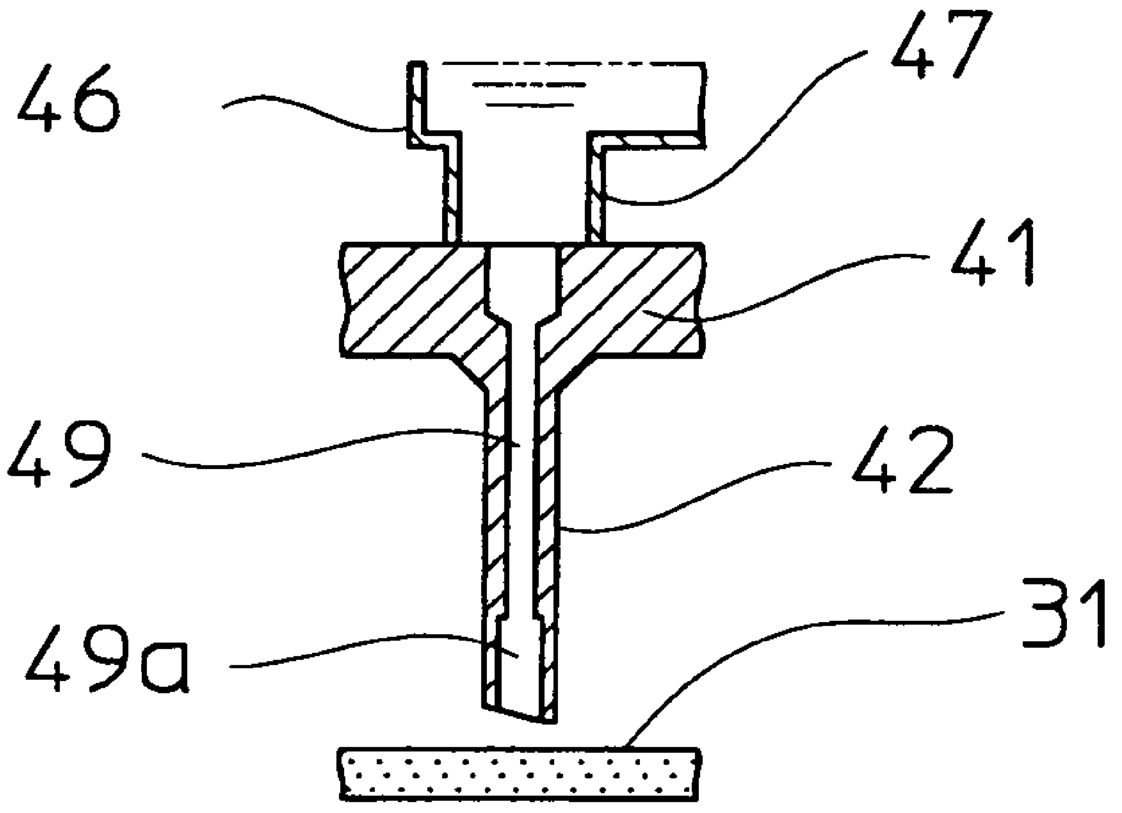
FIG. 5 is an enlarged longitudinal sectional view illustrating the critical portion of a centrifugal separator according to a second embodiment of the present invention.
Figure 6:
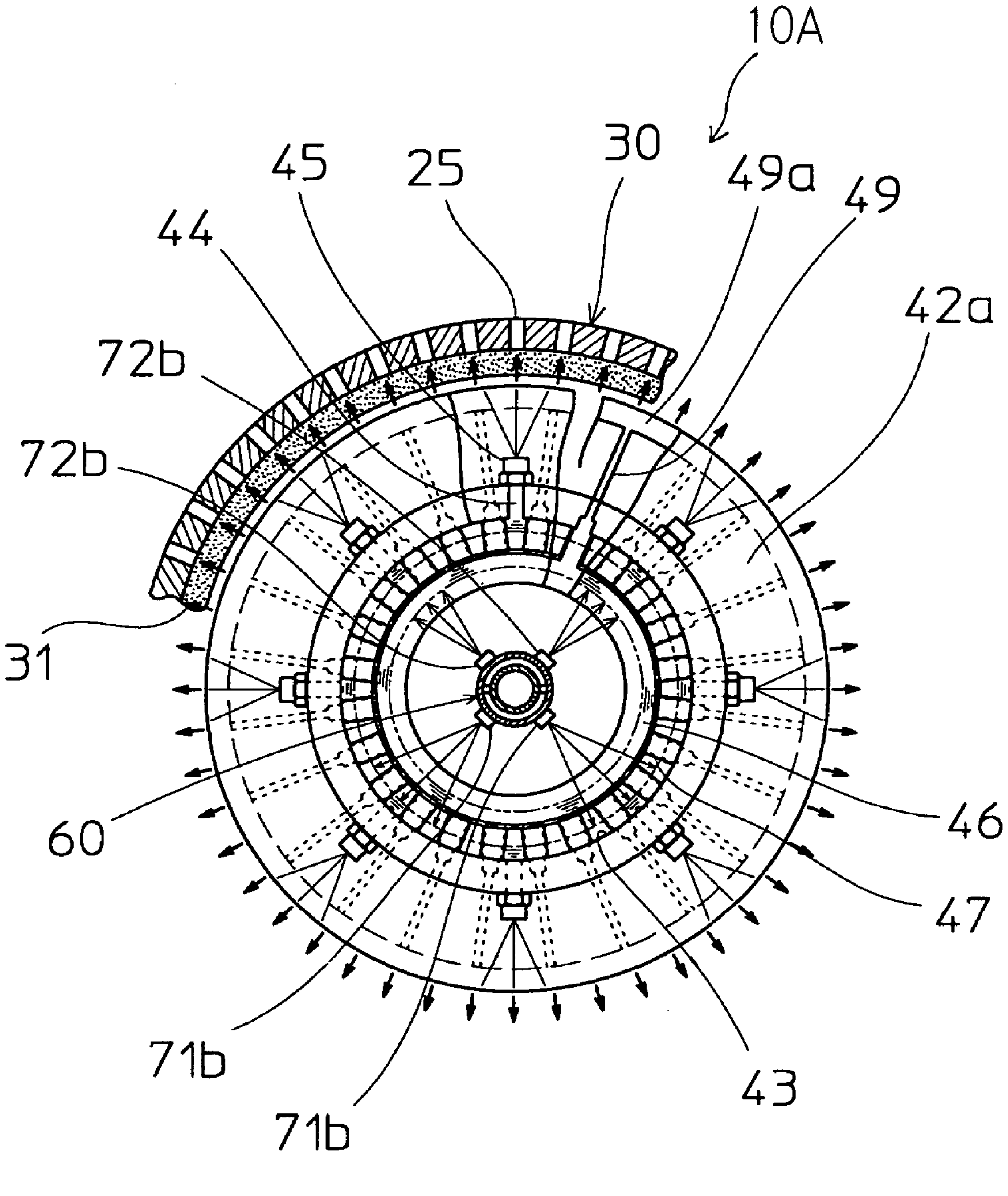
FIG. 6 is a sectional view taken along the line VI—VI in FIG. 4.

FIG. 4 to FIG. 6 show a second embodiment of the present invention.

With a centrifugal separator 10A according to the present embodiment, a channel 49*a* which consecutively extends along the direction of the helix of said flight 42, and to which the tip opening of said respective cleaning liquid discharge holes 49 is connected is formed in the tip surface of the outer circumferential edge of the flight 42 in the above-described first embodiment. Specifically, the width of the channel 49*a* may be set at 1 to 5 mm or so, and the depth may be set at 10 to 25 mm or so, for example. The portions which are the same as those in the first embodiment are provided with the same signs, and a duplicated description thereof is omitted.

According to such second embodiment, the cleaning liquid from the tip opening of said respective cleaning liquid discharge holes 49 is spread throughout the entire area of the outer circumferential edge of the flight 42 along the channel 49*a*, and can be directly jet spouted toward said residual layer object to be treated such that the cleaning liquid is spread over the entire circumference in the radial direction. Thereby, as with said first embodiment, the penetrability of the cleaning liquid through the crystals, and the movability of the residual layer crystals can be enhanced.

Figure 7:
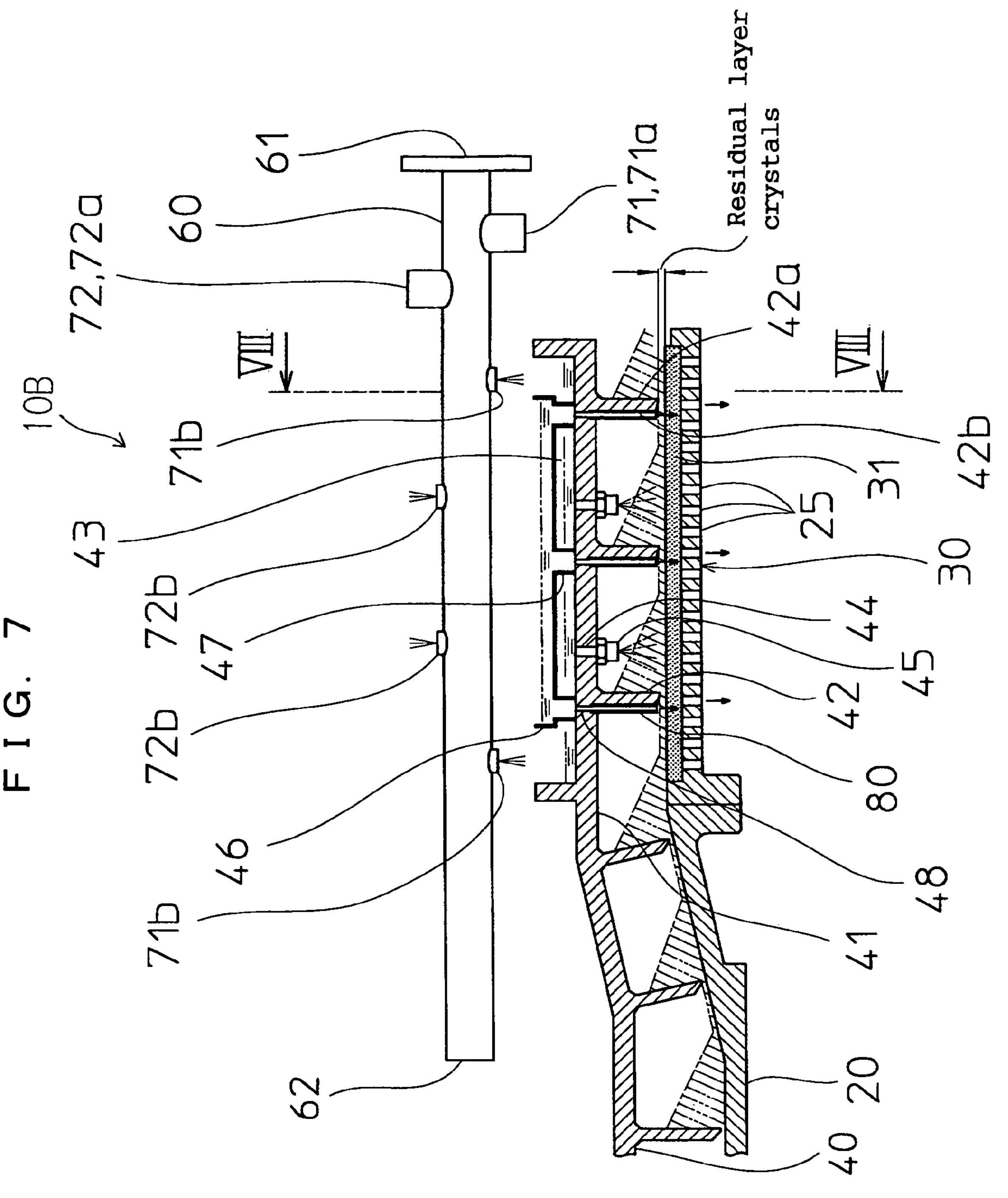
FIG. 7 is a longitudinal sectional view illustrating the critical portion of a centrifugal separator according to a third embodiment of the present invention.
Figure 8:
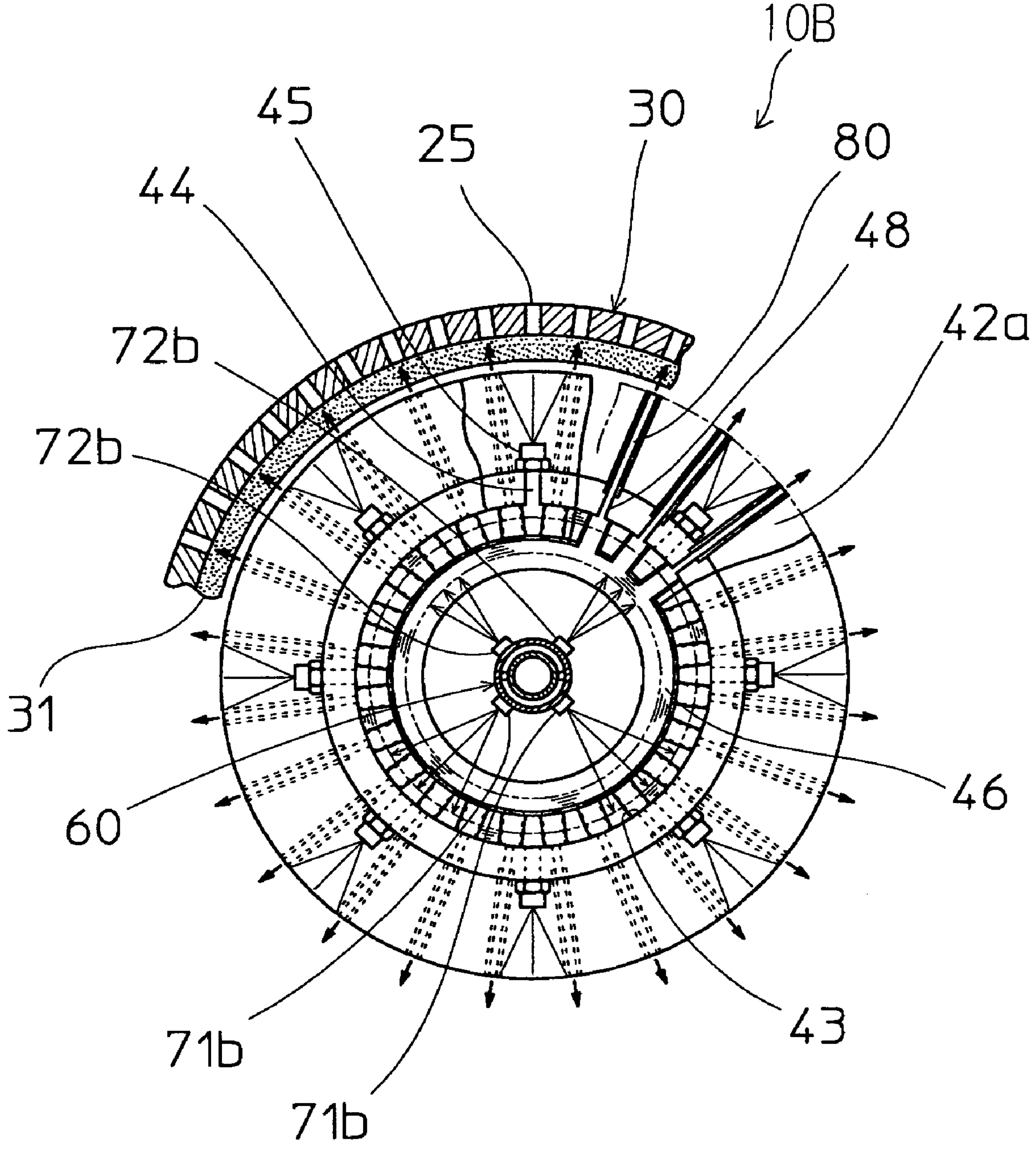
FIG. 8 is a sectional view taken along the line VIII—VIII in FIG. 7.

FIG. 7 and FIG. 8 show a third embodiment of the present invention.

With a centrifugal separator 10B according to the present embodiment, as shown in FIG. 7, the respective connection tubes 47 in said residual layer crystal cleaning liquid receiving part 46 are disposed at prescribed intervals along the direction of the helix of said flight 42 in the locations adjacent to the surface 42*b* on the side opposite to the object-to-be-treated conveying surface 42*a* of the flight 42, and in the circumferential wall of said hub 41, cleaning liquid connection holes 48 to which the respective connection tubes 47 are connected are provided.

And on the surface 42*b* on the side opposite to the object-to-be-treated conveying surface 42*a* of the flight 42 of the screw conveyor 40, a plurality of cleaning liquid discharge pipes 80 which are each connected to said respective cleaning liquid connection holes 48, extending in the radial direction from the inner circumferential edge to the outer circumferential edge of the flight 42, are mounted at prescribed intervals along the direction of the helix of the flight 42. Such cleaning liquid discharge pipes 80 provide a residual layer crystal cleaning liquid path together with the connection tube 47 and the cleaning liquid connection hole 48.

According to such third embodiment, the cleaning liquid inside of said residual layer crystal cleaning liquid receiving part 46 passes through the connection tubes 47 which are provided at prescribed intervals along the direction of the helix of said flight 42 in the locations adjacent to the surface 42*b* on the side opposite to the object-to-be-treated conveying surface 42*a* of the flight 42, and the cleaning liquid connection holes 48 provided in the wall of the hub 41 of said screw conveyor 40, being introduced into the cleaning liquid discharge pipes 80 which are provided at prescribed intervals along the direction of the helix of said flight 42 on the surface 42*b* on the side opposite to the object-to-be-treated conveying surface 42*a* of the flight 42.

The respective cleaning liquid discharge pipes 80 extend radially from the inner circumferential edge to the outer circumferential edge of the flight 42, and from the tip opening of the respective cleaning liquid discharge pipes 80 disposed along the outer circumferential edge of the flight 42, the cleaning liquid can be directly jet spouted toward said residual layer object to be treated. According to such a configuration, the need for work to provide holes in the flight 42 itself is eliminated, and the cleaning liquid discharge pipes 80 can be post-attached to the flight 42, which allows the manufacture to be carried out relatively easily. By radially mounting the respective cleaning liquid discharge pipes 80 with the narrowest possible spacings, the cleaning liquid can be jet spouted toward the residual layer crystals so as to spread over the entire circumference.

Figure 9:
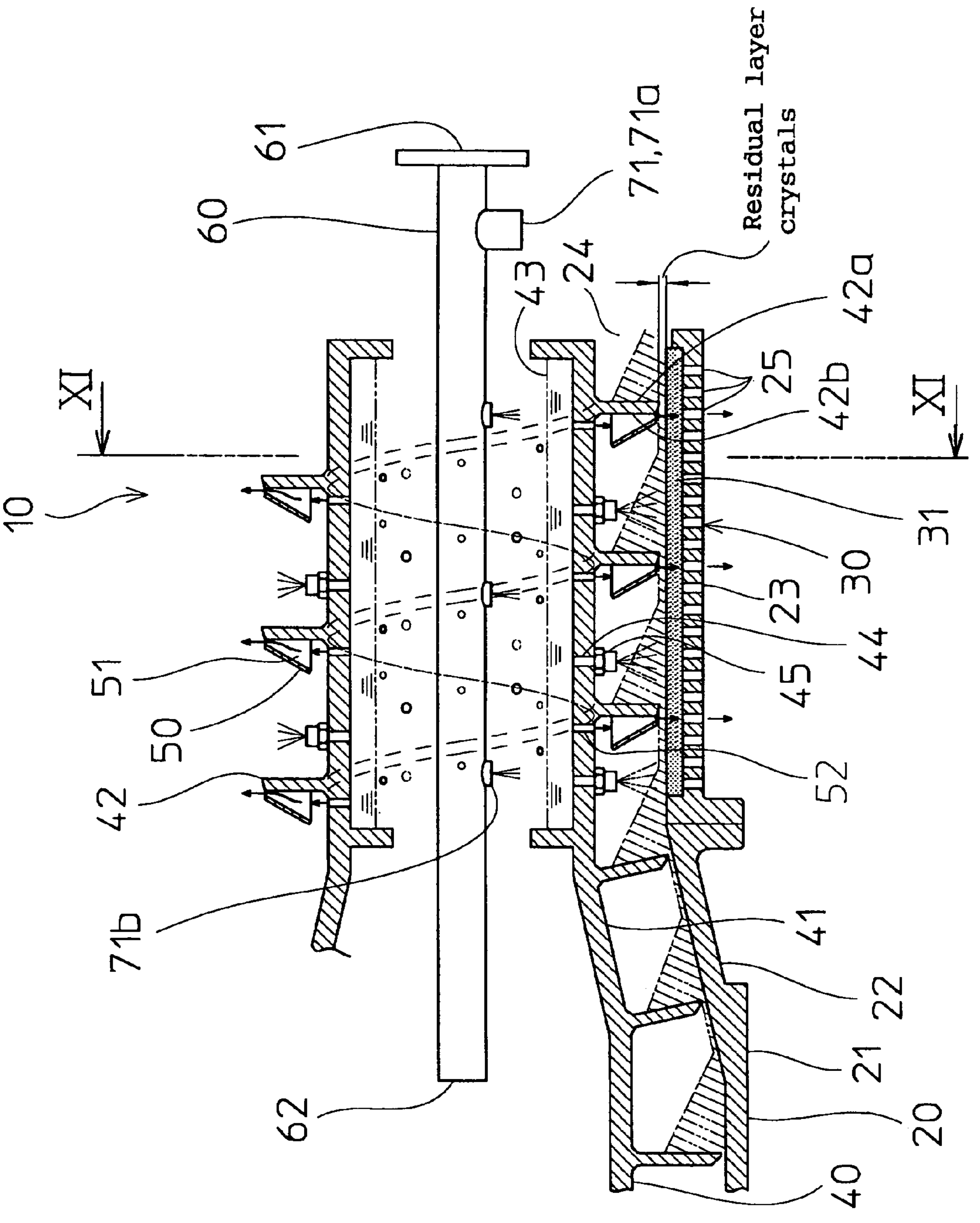
FIG. 9 is a longitudinal sectional view illustrating the critical portion of a centrifugal separator according to a fourth embodiment of the present invention.
Figure 11:
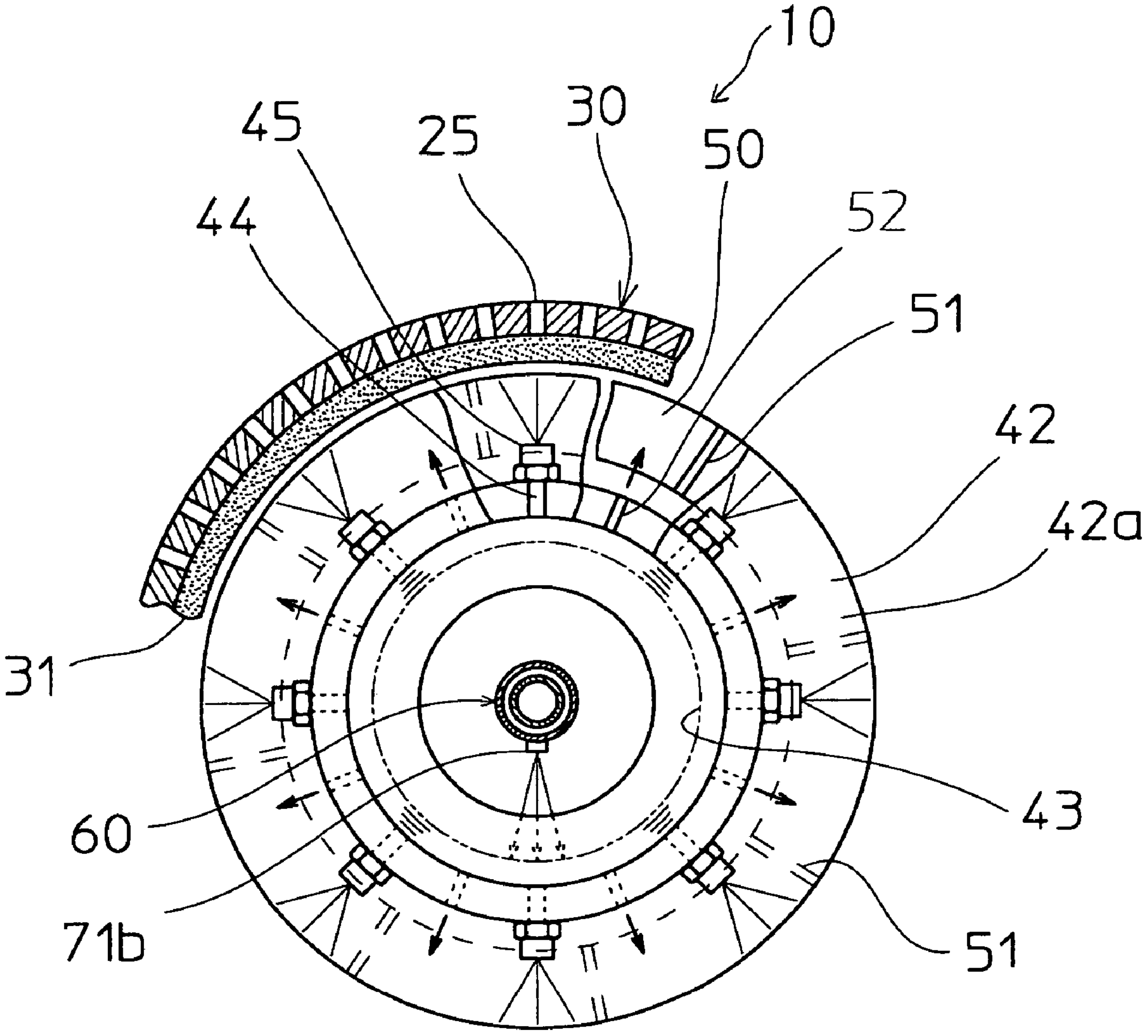
FIG. 11 is a sectional view taken along the line XI—XI in FIG. 9.

FIG. 9 and FIG. 11 show a fourth embodiment of the present invention.

A centrifugal separator 10 according to the present embodiment is a so-called screen bowl type centrifugal separator, comprising a screw conveyor 40 inside of a substantially cylindrical type bowl 20, and supporting the screw conveyor 40 and the bowl 20 such that these are relatively rotatable, and is configured such that a feed stock supplied to the inside of said bowl 20 can be separated into the object to be treated and the mother liquid.

Herein, the object to be treated refers to a variety of crystals, and the like in the chemical industry and the food industry, and particularly, refers to, for example, terephthalic acid, which is a raw material for PET bottles and polyester fabrics, paraxylene, which is a raw material for terephthalic acid, bisphenol, which is a raw material for CD-ROM, monosodium glutamate, which is a raw material for chemical seasonings, and the like. The mother solution refers to various solvents. With the variety of crystals, unpolymerized substances and the solvent constituting the slurry have deposited on their surfaces in the manufacturing process, and these deposited matters can be cleaning-substituted by the cleaning liquid (a specific other solvent, or the like). Hereinbelow, the present embodiment will be described when it is applied to crystals as an object to be treated.

Figure 10:
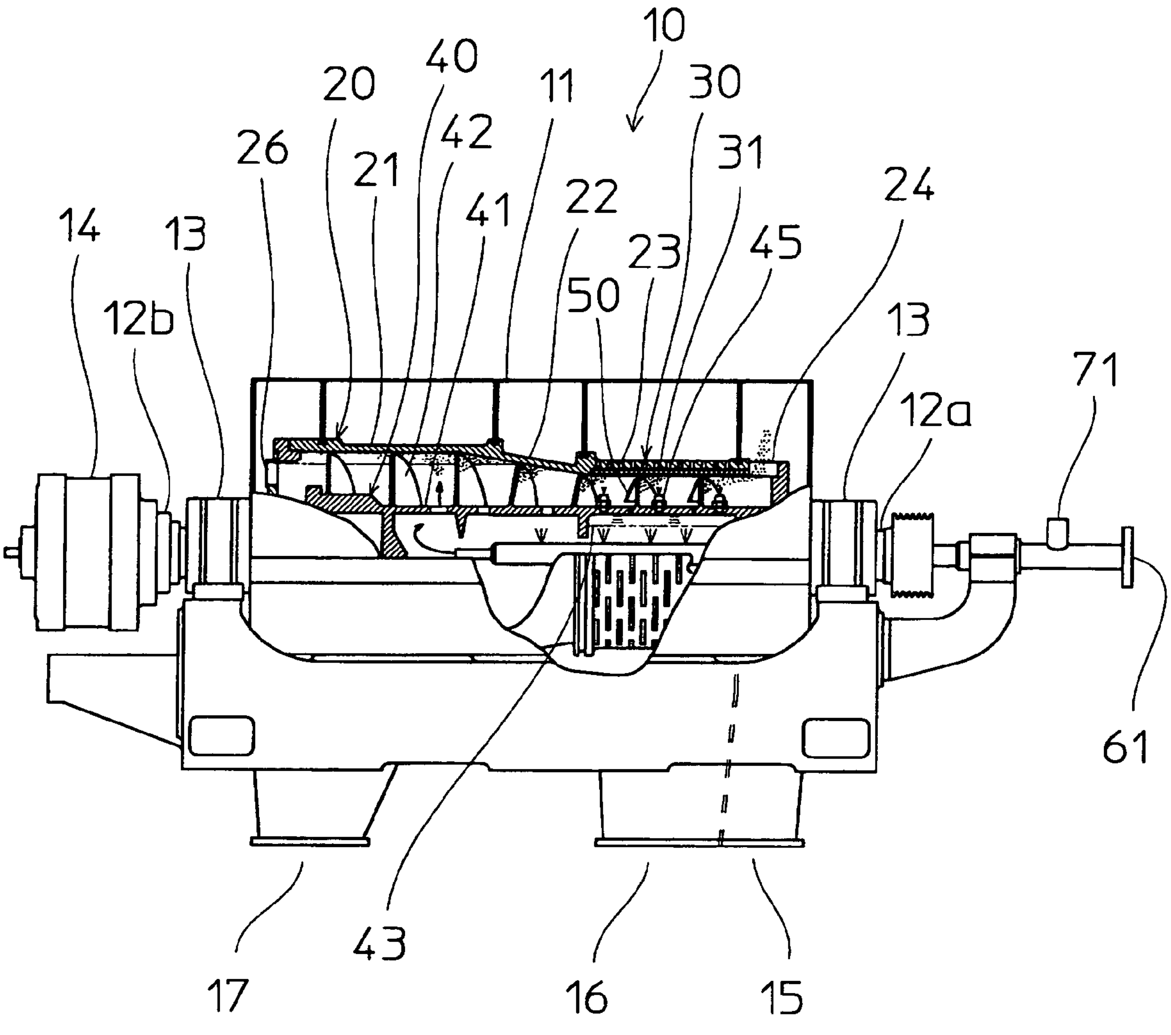
FIG. 10 is a longitudinal sectional view illustrating the whole of a centrifugal separator according to a fourth embodiment of the present invention.

As shown in FIG. 10, the bowl 20 and the screw conveyor 40 inside thereof are rotatably pivotally supported inside of a casing 11 through shafts 12*a*, 12*b*. The bowl 20 and the screw conveyor 40 are rotation-driven with a minute difference in speed by a differential gear 14 connected to a bearing 13 on one side. Such a differential gear 14 itself is well known, and thus detailed description is omitted.

The inside of the casing 11 is partitioned for providing a later described discharge port 24 provided for the bowl 20, a screen part 30, a dam part 26, and the like, respectively. And, under the casing 11, a crystal discharge port 15 connected to said discharge port 24, a cleaning liquid discharge port 16 connected to said screen part 30, and a mother liquid discharge port 17 connected to said dam part 26 are provided, respectively.

One end side (the right side in FIG. 10) of the bowl 20 provides the direction along which crystals are discharged, and from the other end side (the left side in FIG. 10) of the bowl 20, the bowl is partitioned into a parallel cylinder part 21 with a larger diameter, a tapered part 22 which inside diameter is gradually reduced toward the one end, and a parallel cylinder part 23 with a smaller diameter, in this order. On the end side of the parallel cylinder part 23 with a smaller diameter, a crystal discharge port 24 is formed, and on the end side of the parallel cylinder part 21 with a larger diameter, a dam part 26 which regulates the liquid level measured along the radial direction of the bowl 20, and is capable of discharging the mother liquid after the crystals having been separated, to the outside of the bowl 20 is provided.

As shown in FIG. 9, the parallel cylinder part 23 with a smaller diameter has a number of filtered liquid discharge holes 25 formed in the wall surface, and is covered with a cylindrical filtering medium 31 over the entire circumference on the inner circumference side, thus providing the screen part 30. For the size of the filtered liquid discharge hole 25, there is no need for much consideration about the diameter of the crystal particles, but the filtering medium 31 is made of a material having a number of minute holes or slits which diameter or size is smaller than the particle diameter of the crystals. Specifically, a wedge wire screen, a porous ceramic molding, or the like, may be used, for example. The inner circumferential surface of the parallel cylinder part 23 is cut by the depth equivalent to the thickness of the filtering medium 31.

The screw conveyor 40 is made up of a hub 41 which provides an axis of rotation therefor, and a flight 42 which is provided in the form of a screw on the outer circumference of the hub 41, and the flight 42 is formed such that the crystals are conveyed toward the one end side (the right side in FIG. 10) of the bowl 20. Between the outer circumferential edge of the flight 42 and the inner circumferential surface of the parallel cylinder part 23 (the surface of the filtering medium 31 of the screen part 30), a clearance in the radial direction is provided because the screw conveyor 40 and the bowl 20 are constructed to be rotated at different speeds.

The hub 41 is provided with a cleaning liquid receiving part 43 which receives the cleaning liquid supplied to the inside of the hub 41, and a cleaning nozzle 45 which jet spouts the cleaning liquid from the inside of the cleaning liquid receiving part 43 toward the screen part 30 of said bowl 20. The cleaning liquid receiving part 43 is made up of a portion which is surrounded by a partition extending by a prescribed width in the axial direction around the entire circumference of the inner circumferential surface of the hub 41.

In the circumferential wall of the hub 41 that provides the bottom side of the cleaning liquid receiving part 43, a cleaning liquid connection hole 44 is provided at prescribed intervals, and on the outer circumferential surface side of the hub 41, a cleaning nozzle 45 which is connected to said cleaning liquid connection hole 44 is protruded. Herein, the cleaning nozzle 45 is disposed slightly off the pitch center of the flight 42 toward the other end side (the left side in FIG. 9) and in a location where it is opposed to the screen part 30 in the radial direction, as shown in FIG. 9.

Further, inside of the cleaning liquid receiving part 43, a plurality of residual layer crystal cleaning liquid discharge holes 52 which are arranged at prescribed intervals along the direction of the helix of the flight 42 are provided in the locations adjacent to the surface 42*b* on the side opposite to the object-to-be-treated conveying surface 42*a* of the flight 42. Such residual layer crystal cleaning liquid discharge holes 52 are for directly jet spouting the cleaning liquid inside of said cleaning liquid receiving part 43 toward the residual layer crystals on the screen part 30, besides said cleaning nozzles 45.

Along the outer circumferential edge of the surface 42*b* on the side opposite to the object-to-be-treated conveying surface 42*a* of the flight 42, a cover flight 50 with a small width that extends in the direction of the helix of the flight 42 is mounted with a prescribed spacing being given with respect to the surface 42*b* on the side opposite to the object-to-be-treated conveying surface 42*a*. The cleaning liquid springing out from said residual layer crystal cleaning liquid discharge hole 52 is directly jet spouted toward said residual layer crystals through the clearance between the outer circumferential edge of the flight 42 and the cover flight 50.

The cover flight 50 is disposed, being provided with a slope with respect to the surface 42*b* on the side opposite to the object-to-be-treated conveying surface 42*a* of the flight 42 such that the clearance is gradually narrowed down from the side closer to said hub 41 to the side closer to the outer circumferential edge of the flight 42, and is mounted through supporting plates 51 which are arranged at prescribed intervals along the direction of the helix of the flight 42.

Into the inside of the hub 41, a feed tube 60 for supplying the feed stock that extends along the axial direction of the hub 41 is inserted. The starting end of the feed tube 60 extends out beyond the hub 41 and the bowl 20, providing a feed stock supply port 61, and the terminating end of the feed tube 60 is disposed substantially at the center of the inside of the hub 41, providing a feed stock outlet port 62. Further, into the inside of the feed tube 60, a cleaning liquid supply tube 71 for supplying the cleaning liquid to the inside of said cleaning liquid receiving part 43 is inserted.

The starting end of the cleaning liquid supply tube 71 provides a cleaning liquid supply port 71*a* which opens substantially at right angles to the axial direction on the starting end side of the feed tube 60. In addition, at intermediate points on the feed tube 60 that are opposed to the cleaning liquid receiving part 43 in the radial direction inside of the hub 41, openings 71*b* of the cleaning liquid supply tube 71 are opened substantially at right angles to the axial direction.

Next, the function of the centrifugal separator 10 according to the fourth embodiment will be described.

In FIG. 9 and FIG. 10, the feed stock is supplied to the inside of the bowl 20 through the feed tube 60 by use of a pump or other driving source. The feed stock which is fed from the feed stock supply port 61 of the feed tube 60 comes from the feed stock outlet port 62 located substantially in the vicinity of the center inside of the hub 41 of the screw conveyor 40, filling the bowl 20 to a prescribed level which is preset by the dam part 26 inside of the bowl 20. The feed stock is subjected to the action of the centrifugal force inside of the bowl 20, resulting in the crystals being settled to be separated from the mother liquid.

The crystals settled onto the inner circumferential surface of the bowl 20 by the action of the centrifugal force are conveyed to the tapered part 22 of the bowl 20 by the flight 42 of the screw conveyor 40 which is rotated at a speed slightly different from that of the bowl 20, and are deliquidized while being moved on the inner circumferential surface of the tapered part 22, being brought closer to the axis than the liquid level preset by the dam part 26, before further being conveyed to the screen part 30.

The crystals deliquidized on the way of being conveyed have impurities produced in the process of manufacture thereof, and the mother liquid itself deposited on their surfaces, and the crystals which have reached the screen part 30 are cleaned by the cleaning liquid jet spouted from the cleaning nozzle 45 provided in the hub 41. As the cleaning liquid, pure water, acetic acid solution, pure phenol solution, sulfuric acid solution, hydrochloric acid solution, or the like is generally used, and the cleaning liquid is supplied to the inside of the cleaning liquid receiving part 43 provided inside of the hub 41 through the cleaning liquid supply tube 71 which is separately inserted into the feed tube 60. The cleaning liquid received by the cleaning liquid receiving part 43 is passed through the cleaning liquid connection hole 44 in the circumferential wall of the hub 41 before being jet spouted from the cleaning nozzle 45.

The crystals are thus subjected to cleaning and deliquidization in the screen part 30, and further conveyed toward the discharge port 24, however, in the clearance between the outer circumferential edge of the flight 42 of the screw conveyor 40 and the inner circumferential surface of the screen part 30, a residual layer of crystals is formed. Such residual layer crystals are directly and locally cleaned by the cleaning liquid which is jet spouted from the outer circumferential edge of the flight 42, besides the cleaning provided by said cleaning nozzles 45.

In other words, the cleaning liquid inside of the cleaning liquid receiving part 43 springs out into the inside of the bowl 20 also from the plurality of residual layer crystal cleaning liquid discharge holes 52 which are arranged at prescribed intervals along the direction of the helix of the flight 42 in the locations adjacent to the surface 42*b* on the side opposite to the object-to-be-treated conveying surface 42*a* of the flight 42. The cleaning liquid which has sprung out is directly jet spouted toward said residual layer crystals through the small clearance between the cover flight 50 mounted along the outer circumferential edge of the surface 42*b* on the side opposite to the object-to-be-treated conveying surface 42*a* of said flight 42, and the outer circumferential edge of the flight 42 without being scattered.

In particular, because the cover flight 50 is mounted, being provided with a slope with respect to the surface 42*b* on the side opposite to the object-to-be-treated conveying surface 42*a* of said flight 42 such that the clearance is gradually narrowed down from the side closer to the hub 41 to the side closer to the outer circumferential edge of the flight 42, and is mounted through the supporting plates 51 which are arranged at prescribed intervals, as shown in FIG. 9, the cleaning liquid which springs out from the respective residual layer crystal cleaning liquid discharge holes 52 can be received in a wide span, and the received cleaning liquid can be directly and locally jet spouted toward the residual layer crystals from a narrow span.

As described above, besides cleaning of the whole of the crystals by means of the cleaning nozzles 45, the residual layer object to be treated can be locally cleaned as well in particular, thus no residual layer crystals are anchored, resulting in the movability being enhanced, and the penetrability of the cleaning liquid through the whole of the crystals during conveying being improved. Therefore, crystal clogging in the screen part 30 can be prevented; the amount of the cleaning liquid as that for substitution of the impurities in the crystals, which is the original application, can be minimized; and the amount of leakage of the crystals in the screen part 30 can be minimized.

In the screen part 30, the cleaning liquid which has been jet spouted from the cleaning nozzle 45 and the outer circumferential edge of the flight 42 is passed through the filtering medium 31 after cleaning the crystals and the residual layer crystals, and is discharged from the filtered liquid discharge holes 25 to the outside of the bowl 20. The crystals which have been cleaned and deliquidized in the screen part 30 are discharged from the discharge port 24 to the outside of the bowl 20, and finally recovered from the crystal discharge port 15 provided in the casing 11.

Figure 12:
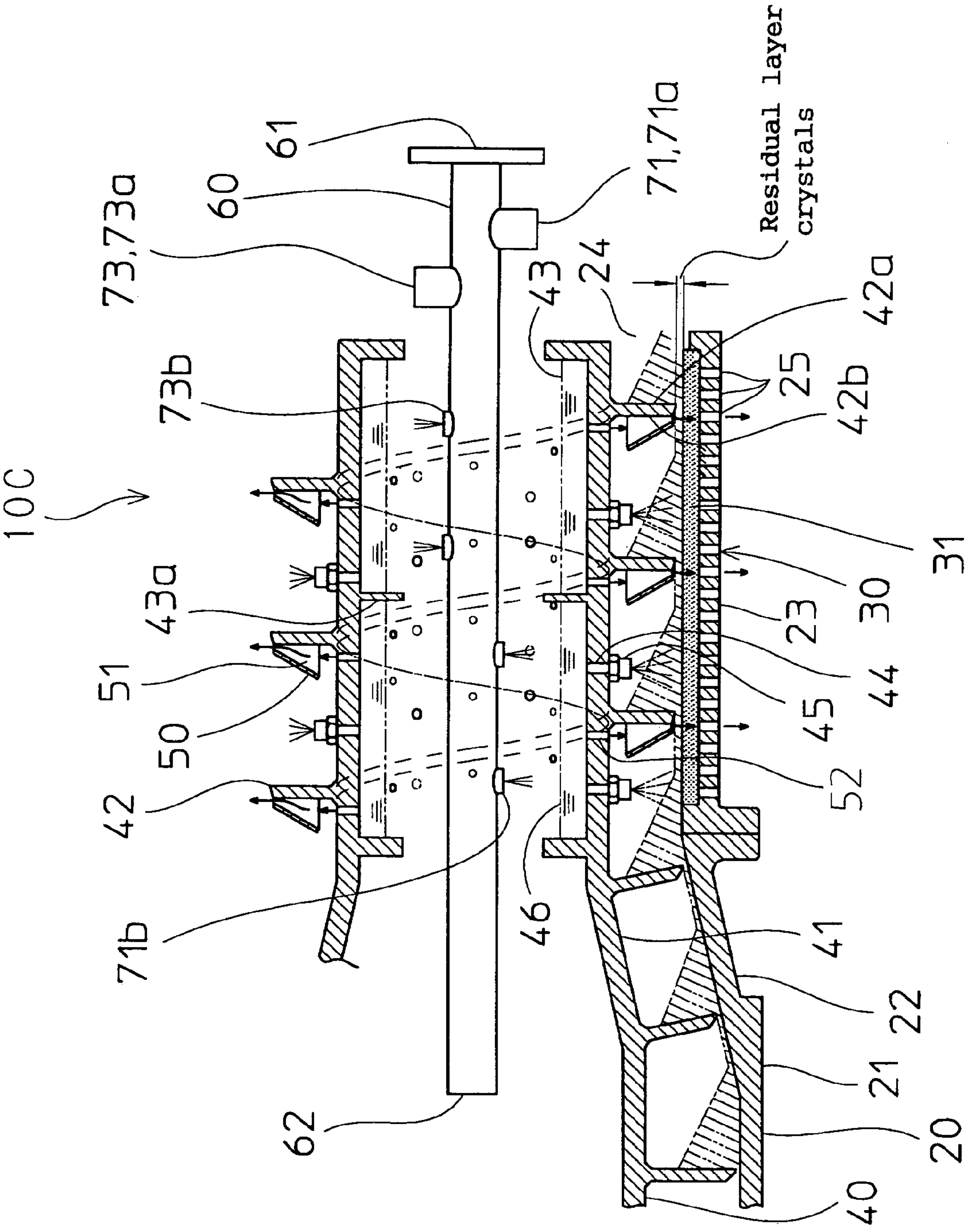
FIG. 12 is a longitudinal sectional view illustrating the critical portion of a centrifugal separator according to a fifth embodiment of the present invention.

FIG. 12 shows a fifth embodiment of the present embodiment.

With a centrifugal separator 10C according to the fifth embodiment, said cleaning liquid receiving part 43 is provided with a partition plate 43*a* which partitions the inside of the cleaning liquid receiving part 43 into two or more in the axial direction in the screen part 30 of said bowl 20 for allowing a particular cleaning range in said screen part 30 to be selected. The portions which are the same as those in the fourth embodiment are provided with the same signs, and a duplicated description thereof is omitted.

Into the inside of the feed tube 60 which is inserted into the inside of the hub 41, a cleaning liquid supply tube 71 for supplying the cleaning liquid to the inside of one (the left-hand portion in FIG. 12) of the compartments produced by the partitioning plate 43*a* inside of said cleaning liquid receiving part 43, and a cleaning liquid supply tube 73 for supplying the cleaning liquid to the inside of the other (the right-hand portion in FIG. 12) of the compartments produced by the partitioning plate 43*a* are separately inserted, respectively.

The starting end of the cleaning liquid supply tube 71 provides a cleaning liquid supply port 71*a* which opens substantially at right angles to the axial direction on the starting end side of the feed tube 60. At intermediate points on the feed tube 60 that are opposed in the radial direction to one (the left-hand portion in FIG. 12) of the compartments produced by the partitioning plate 43*a* inside of the cleaning liquid receiving part 43 inside of the hub 41, openings 71*b* of the cleaning liquid supply tube 71 are opened substantially at right angles to the axial direction.

In addition, the starting end of the cleaning liquid supply tube 73 provides a cleaning liquid supply port 73*a* which opens substantially at right angles to the axial direction on the starting end side of the feed tube 60. At intermediate points on the feed tube 60 that are opposed in the radial direction to the other (the right-hand portion in FIG. 12) of the compartments produced by the partitioning plate 43*a* inside of the cleaning liquid receiving part 43 inside of the hub 41, openings 73*b* of the cleaning liquid supply tube 73 are opened substantially at right angles to the axial direction.

The present embodiment is configured such that a single partition plate 43*a* partitions the inside of the cleaning liquid receiving part 43 into two in the axial direction, however, the number of partitions is, of course, not limited to two as in this embodiment, but, for example, two partition plates 43*a* may be provided for partitioning the inside of the cleaning liquid receiving part 43 into three in the axial direction, or three partition plates 43*a* may be provided for partitioning the inside of the cleaning liquid receiving part 43 into four in the axial direction.

According to such fifth embodiment, the cleaning liquid may be supplied to the inside of all the compartments of the cleaning liquid receiving part 43 through the cleaning liquid supply path 71 and the cleaning liquid supply path 73 separately provided inside of the feed tube 60 for supplying the feed stock to the inside of the bowl 20, or the cleaning liquid may be supplied to the inside of only a part of the compartments.

In such a case, the cleaning liquid is jet spouted toward the screen part 30 only in the range where it is opposed, in the radial direction of the bowl 20, to the inside of the compartment of the cleaning liquid receiving part 43 to which the cleaning liquid has been supplied. Thereby, according to the types, and the like, of the crystals, the object to be treated, and the cleaning liquid, the cleaning range in the screen part 30 can be selected as appropriate.

Figure 13:
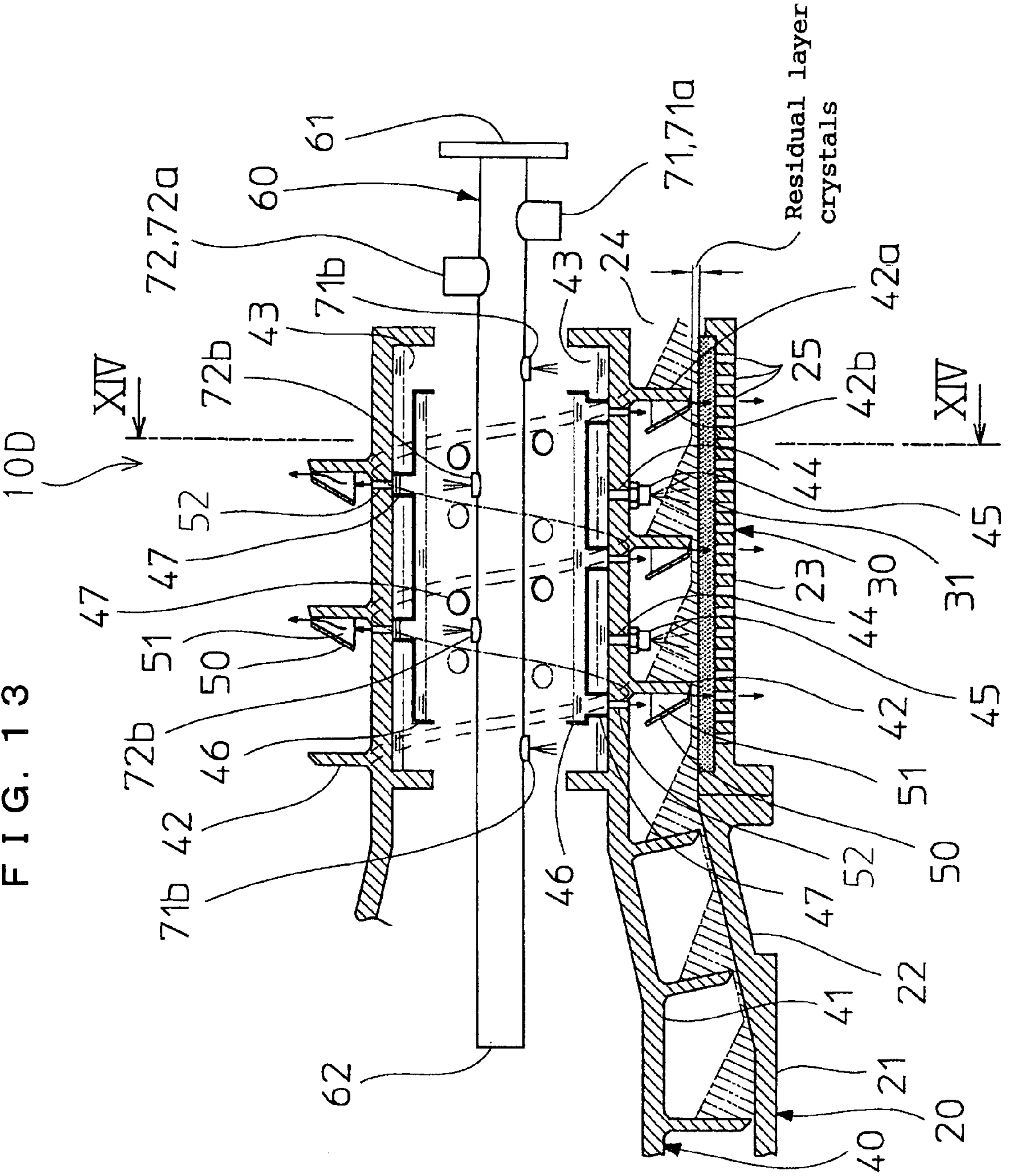
FIG. 13 is a longitudinal sectional view illustrating the critical portion of a centrifugal separator according to a sixth embodiment of the present invention.
Figure 14:
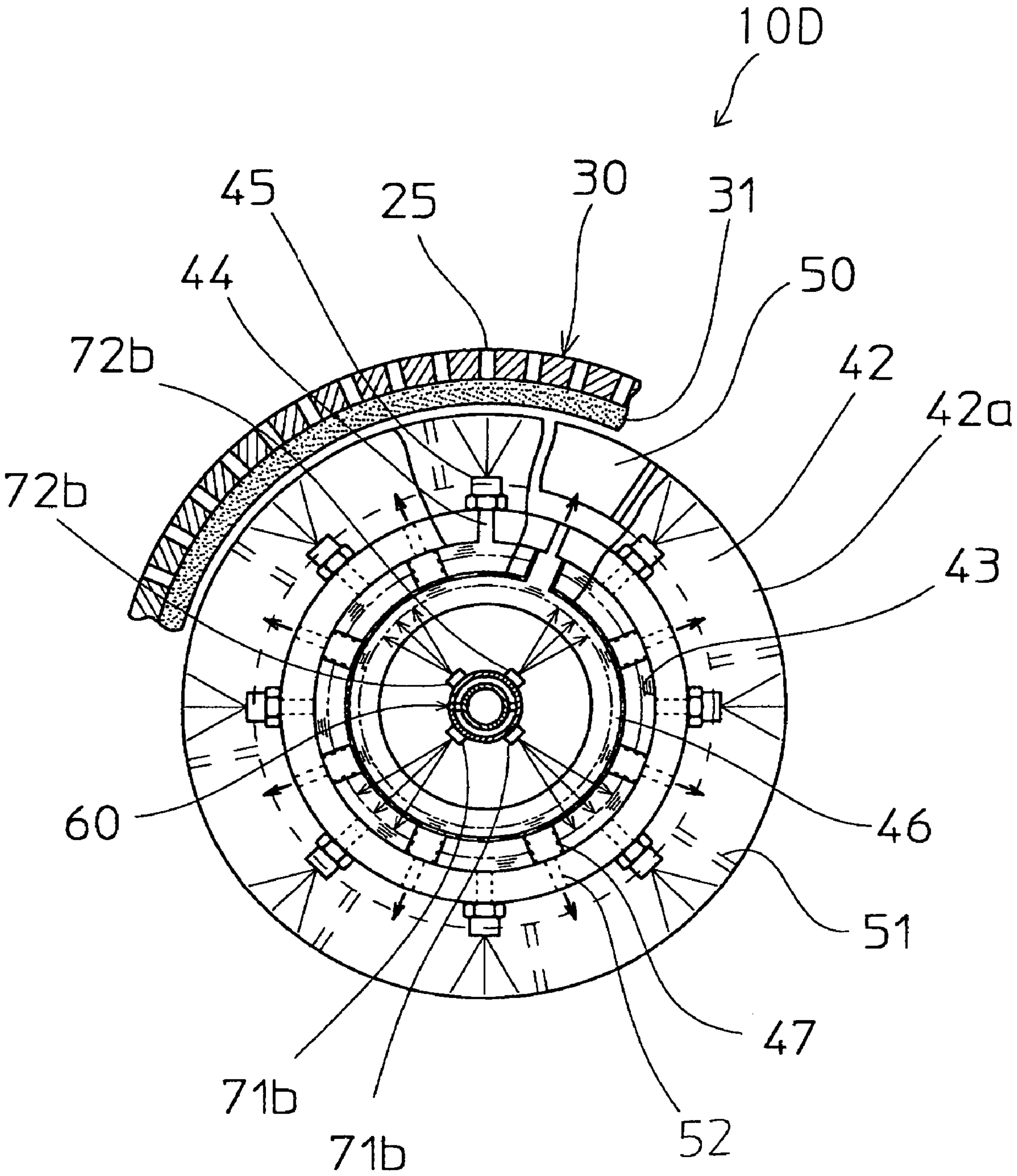
FIG. 14 is a sectional view taken along the line XIV—XIV in FIG. 13.

FIG. 13 and FIG. 14 show a sixth embodiment of the present invention.

With a centrifugal separator 10D according to the present embodiment, a residual layer crystal cleaning liquid receiving part 46 which receives the cleaning liquid for cleaning said residual layer crystals is provided inside of said cleaning liquid receiving part 43, being partitioned independently of the inside of the cleaning liquid receiving part 43.

The residual layer crystal cleaning liquid receiving part 46 is formed by providing a partition which extends by a prescribed width in the axial direction at both ends of a cylindrical member over the entire circumference thereof, and on the bottom side, a connection tube 47 is protruded at prescribed intervals, the respective connection tubes 47 causing the residual layer crystal cleaning liquid receiving part 46 to be fixedly installed with a separation from the inner circumferential surface of the hub 41 inside of said cleaning liquid receiving part 43.

As shown in FIG. 13, the respective connection tubes 47 are disposed at prescribed intervals along the direction of the helix of said flight 42 in the locations adjacent to the surface 42*b* on the side opposite to the object-to-be-treated conveying surface 42*a* of the flight 42, and in the circumferential wall of said hub 41, residual layer crystal cleaning liquid discharge holes 52 to which the respective connection tubes 47 are connected are provided. The cleaning liquid inside of the residual layer crystal cleaning liquid receiving part 46 that springs out from the residual layer crystal cleaning liquid discharge hole 52 is directly jet spouted toward said residual layer crystals through the clearance between the cover flight 50 and the outer circumferential edge of the flight 42.

Into the inside of said feed tube 60, a cleaning liquid supply tube 71 providing a cleaning liquid supply path for supplying the cleaning liquid to the inside of said cleaning liquid receiving part 43, and a residual layer crystal cleaning liquid supply tube 72 providing a residual layer crystal cleaning liquid supply path for supplying the cleaning liquid to the inside of said residual layer crystal cleaning liquid receiving part 46 are separately inserted, respectively.

The starting end of the cleaning liquid supply tube 71 provides a cleaning liquid supply port 71*a* which opens substantially at right angles to the axial direction on the starting end side of the feed tube 60. In addition, at intermediate points on the feed tube 60 that are opposed to the cleaning liquid receiving part 43 in the radial direction inside of the hub 41, openings 71*b* of the cleaning liquid supply tube 71 are opened substantially at right angles to the axial direction.

On the other hand, the starting end of the residual layer crystal cleaning liquid supply tube 72 provides a residual layer crystal cleaning liquid supply port 72*a* which opens substantially at right angles to the axial direction on the starting end side of the feed tube 60. In addition, at intermediate points on the feed tube 60 that are opposed to the residual layer crystal cleaning liquid receiving part 46 in the radial direction inside of the hub 41, openings 72*b* of the residual layer crystal cleaning liquid supply tube 72 are opened substantially at right angles to the axial direction.

According to the sixth embodiment as described above, the cleaning liquid which has been supplied to the inside of the residual layer crystal cleaning liquid receiving part 46 passes through the connection tubes 47 which are provided at prescribed intervals along the direction of the helix of the flight 42 in the locations adjacent to the surface 42*b* on the side opposite to the object-to-be-treated conveying surface 42*a* of the flight 42, and springs out from the residual layer crystal cleaning liquid discharge holes 52 provided in the wall of the hub 41 of the screw conveyor 40.

The cleaning liquid which has sprung out into the inside of the bowl 20 can be directly jet spouted toward said residual layer crystals through the small clearance between the cover flight 50 mounted along the outer circumferential edge of the surface 42*b* on the side opposite to the object-to-be-treated conveying surface 42*a* of said flight 42, and the outer circumferential edge of the flight 42, without being scattered.

Herein, the cleaning liquid is separately supplied to the inside of the cleaning liquid receiving part 43 and the inside of the residual layer crystal cleaning liquid receiving part 46, which are partitioned from each other, thus the amount of the cleaning liquid which is jet spouted from the cleaning nozzles 45 and the amount of the cleaning liquid which is jet spouted from the small clearance between the cover flight 50 and the outer circumferential edge of the flight 42 can be separately controlled from the external, which allows both amounts of the cleaning liquid to be easily adjusted to be set at an optimum value, respectively, for minimization of the substitution rate for crystal cleaning and the amount of leakage.

Figure 15:
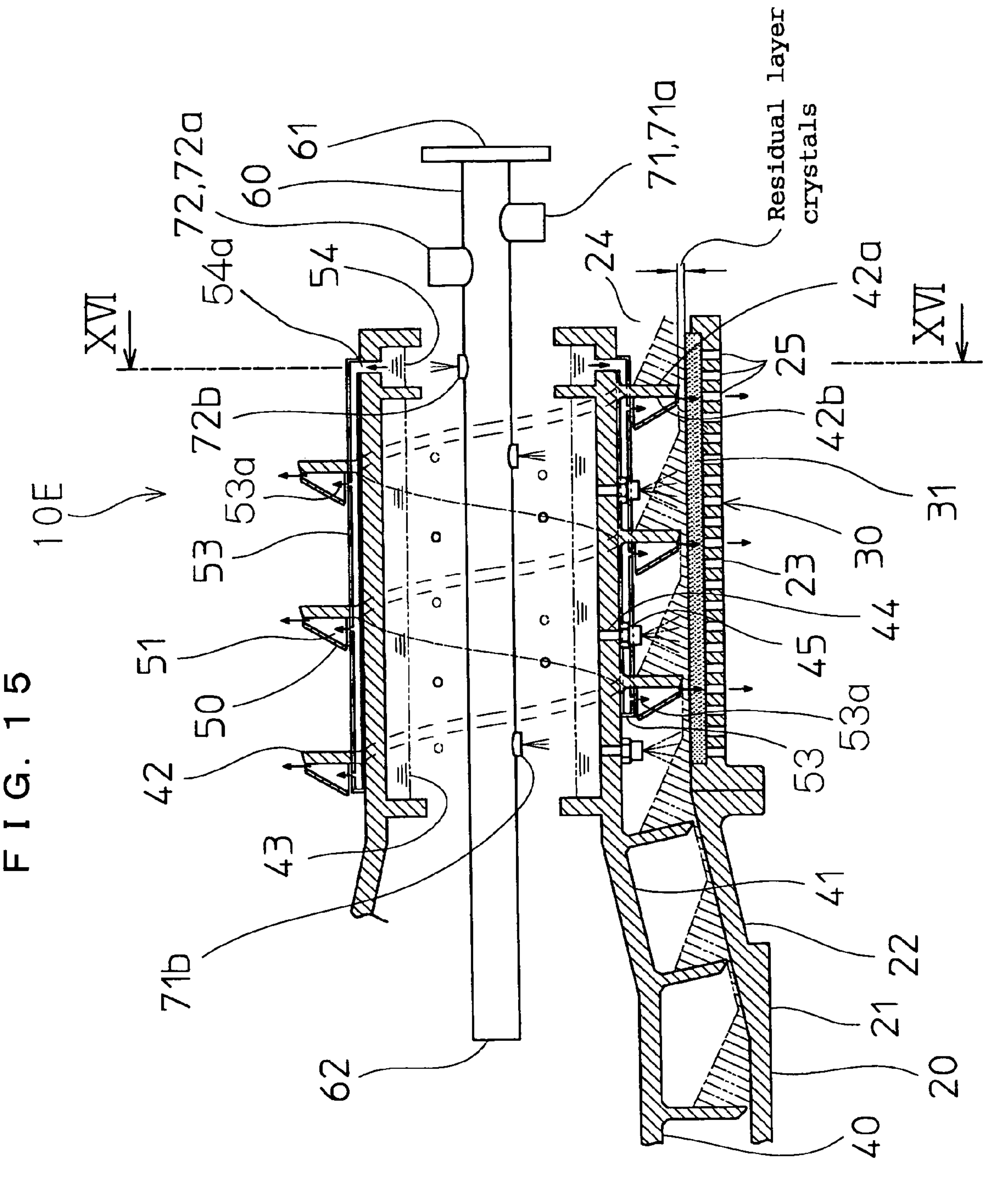
FIG. 15 is a longitudinal sectional view illustrating the critical portion of a centrifugal separator according to a seventh embodiment of the present invention.
Figure 16:
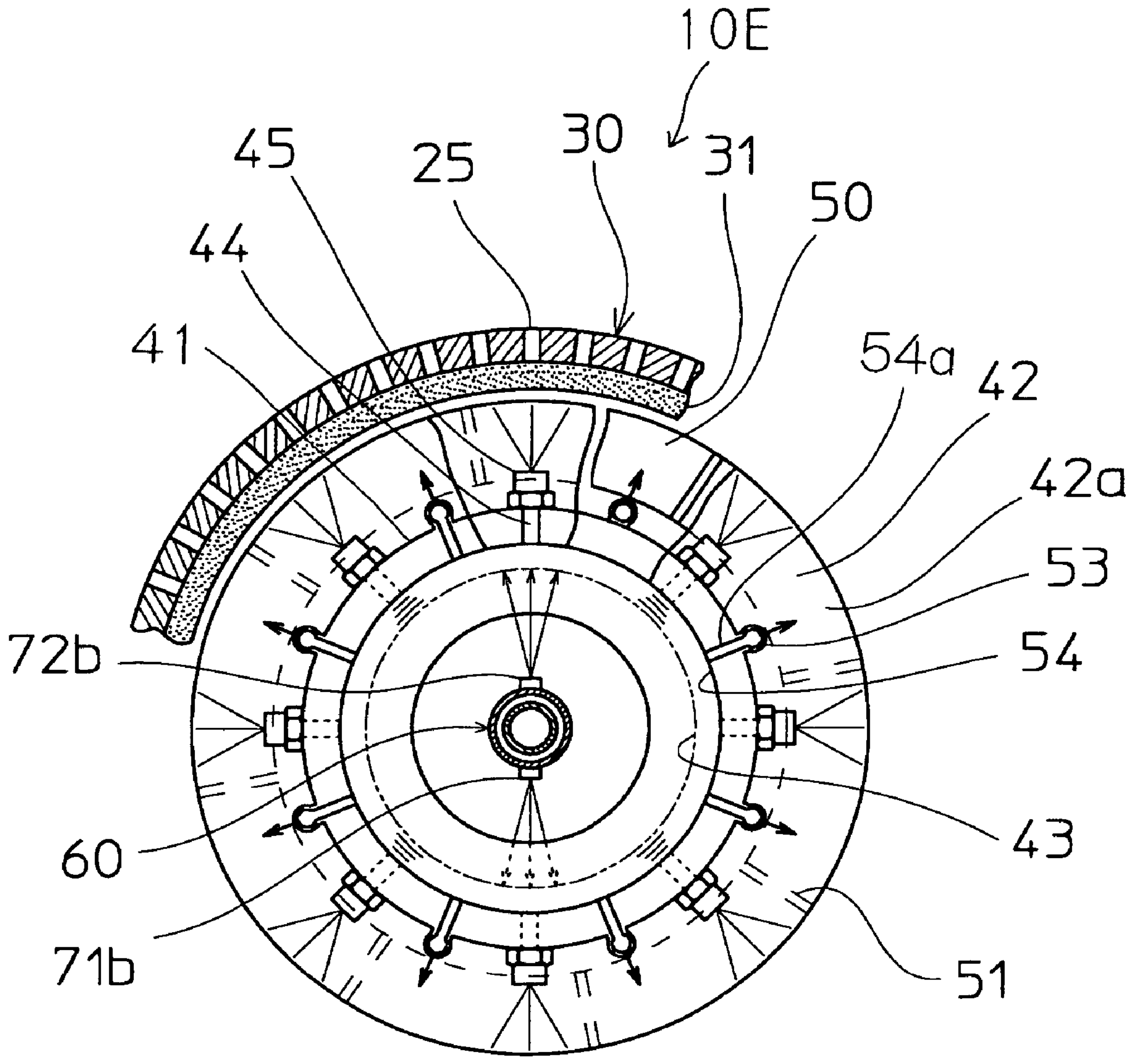
FIG. 16 is a sectional view taken along the line XVI—XVI in FIG. 15.

FIG. 15 and FIG. 16 show a seventh embodiment of the present invention.

With a centrifugal separator 10E according to the present embodiment, a residual layer crystal cleaning liquid receiving chamber 54 which receives the cleaning liquid for cleaning said residual layer crystals is provided inside of the hub 41 of said screw conveyor 40 on one side thereof, being partitioned independently of said cleaning liquid receiving part 43. In the present embodiment, the residual layer crystal cleaning liquid receiving chamber 54 is provided in the extreme portion of the hub 41.

On the outer circumference of the hub 41, a plurality of residual layer crystal cleaning liquid introducing tubes 53 are mounted such that they are arranged at prescribed intervals in the circumferential direction of the hub 41, being extended along the axial direction of the hub 41 so as to penetrate through said flight 42, respectively. In the bottom of said residual layer crystal cleaning liquid receiving chamber 54, a residual layer crystal cleaning liquid connection hole 54*a* is bored, and the respective residual layer crystal cleaning liquid introducing tubes 53 are connected, on one side thereof, to the inside of the residual layer crystal cleaning liquid receiving chamber 54 through the residual layer crystal cleaning liquid connection hole 54*a*, respectively.

The respective residual layer crystal cleaning liquid introducing tubes 53 are closed on the other side thereof, however, at intermediate points on the respective residual layer crystal cleaning liquid introducing tubes 53, a plurality of residual layer crystal cleaning liquid discharge holes 53*a* which are arranged at prescribed intervals along the direction of the helix of the flight 42 in the locations adjacent to the surface 42*b* on the side opposite to the object-to-be-treated conveying surface 42*a* of said flight 42 are provided.

The cleaning liquid inside of the residual layer crystal cleaning liquid receiving chamber 54 that springs out from the respective residual layer crystal cleaning liquid discharge holes 53*a* is directly jet spouted toward said residual layer crystals from the clearance between said cover flight 50 and the outer circumferential edge of the flight 42. At an intermediate point on the feed tube 60 that is opposed to the residual layer crystal cleaning liquid receiving chamber 54 in the radial direction inside of the hub 41, an opening 72*b* of the residual layer crystal cleaning liquid supply tube 72 is opened substantially at right angles to the axial direction.

According to the seventh embodiment as described above, the cleaning liquid which has been supplied to the inside of the residual layer crystal cleaning liquid receiving chamber 54 is introduced into the respective plurality of residual layer crystal cleaning liquid introducing tubes 53 arranged on the outer circumference of the hub 41. And, the cleaning liquid which has been introduced into the respective residual layer crystal cleaning liquid introducing tubes 53 passes through the respective plurality of residual layer crystal cleaning liquid discharge holes 53*a* which are provided at prescribed intervals at intermediate points on the respective residual layer crystal cleaning liquid introducing tubes 53, springing out into the inside of the bowl 20.

The cleaning liquid which has sprung out into the inside of the bowl 20 can be directly jet spouted toward said residual layer crystals through the small clearance between the cover flight 50 mounted along the outer circumferential edge of the surface 42*b* on the side opposite to the object-to-be-treated conveying surface 42*a* of said flight 42, and the outer circumferential edge of the flight 42, without being scattered. Thereby, the cleaning of the object to be treated by said cleaning nozzles 45 and the cleaning of the residual layer crystals by the respective residual layer crystal cleaning liquid introducing tubes 53 can be separately performed, which allows the respective cleaning liquids to be rendered different from each other in type and amount of liquid.

Now, the embodiments of the present invention have been described with reference to the drawings, and according to these specific configurations, the penetrability of the cleaning liquid through the crystals, and the movability of the residual layer crystals can be enhanced. However, the present invention is not limited to these embodiments, and any alterations, modifications, and additions within the spirit and scope of the present invention as defined by the appended claims are, of course, included in the present invention.

INDUSTRIAL APPLICABILITY

According to the centrifugal separator pertaining to the present invention, the cleaning liquid can be directly jet spouted toward the residual layer object to be treated anchored to the inner circumferential surface of the screen part from the outer circumferential edge of the flight of the screw conveyor, thus the movability of this residual layer is improved, and the penetrability of the whole of the cleaning liquid is increased. Therefore, only the residual layer object to be treated can be locally cleaned to enhance the content of the liquid in the object to be treated, and thus solidification of the residual layer can be prevented.

When the cleaning liquid is applied to the whole of the object to be treated, a part of the object to be treated is caused to leak in the screen part by the amount which is in proportion to that of the cleaning liquid passing through the layer of the object to be treated, and the amount which is in proportion to the mesh size of the screen part, however, by jet spouting the cleaning liquid directly toward the residual layer object to be treated from the outer circumferential edge of the flight as described above, the solidification of the residual layer object to be treated is eliminated, and the penetrability of the cleaning liquid through the object to be treated during conveying is improved, thus the amount of the cleaning liquid as that for substitution of the impurities in the object to be treated, which is the original application, can be minimized; and the total amount of leakage of the object to be treated in the screen part can be minimized.

What is claimed is:

1. A centrifugal separator (10, 10A, 10B) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein a liquid conduction part for jet spouting at least a part of the cleaning liquid directly toward the residual layer crystals formed in the clearance between the outer circumferential edge of the flight (42) of said screw conveyor (40) and the inner circumferential surface of said screen part (30) is provided; and the tip of at least a part of the cleaning liquid conduction part is located within 10 mm from the inner surface of the screen part (30).

2. A centrifugal separator (10, 10A, 10B) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein a residual layer crystal cleaning liquid receiving part (46) for receiving the cleaning liquid for cleaning the residual layer object to be treated formed in the clearance between the outer circumferential edge of the flight (42) of said screw conveyor (40) and the inner circumferential surface of said screen part (30) is provided inside of said cleaning liquid receiving part (43), being partitioned independently of the inside of said cleaning liquid receiving part (43); and a residual layer crystal cleaning liquid path is formed along the direction of the helix of said flight (42) for causing the cleaning liquid inside of said residual layer crystal cleaning liquid receiving part (46) to be directly jet spouted toward said residual layer object to be treated from the outer circumferential edge of said flight (42), with no relation to said cleaning liquid receiving part (43).

3. The centrifugal separator (10, 10A, 10B) of claim 2, wherein, into the inside of the hub (41) of said screw conveyor (40), a feed tube (60) for supplying the feed stock that extends in the axial direction of the hub (41) is inserted;

a cleaning liquid supply path (71) for supplying the cleaning liquid to the inside of said cleaning liquid receiving part (43) is formed inside of said feed tube (60), and at intermediate points on the feed tube (60) that are opposed to said cleaning liquid receiving part (43) in the radial direction, openings of said cleaning liquid supply path (71) are provided; and a residual layer crystal cleaning liquid supply path (72) for supplying the cleaning liquid to the inside of said residual layer crystal cleaning liquid receiving part (46) is formed inside of said feed tube (60), and at intermediate points on the feed tube (60) that are opposed to said residual layer crystal cleaning liquid receiving part (46) in the radial direction, openings of said residual layer crystal cleaning liquid supply path (72) are provided.

4. A centrifugal separator (10, 10A) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein a residual layer crystal cleaning liquid receiving part (46) for receiving the cleaning liquid for cleaning the residual layer object to be treated formed in the clearance between the outer circumferential edge of the flight (42) of said screw conveyor (40) and the inner circumferential surface of said screen part (30) is provided inside of said cleaning liquid receiving part (43), being partitioned independently of the inside of said cleaning liquid receiving part (43);

in the locations where the inner circumferential edges of said flight (42) range, a connection tube (47) is provided at prescribed intervals along the direction of the helix of the flight (42) on the bottom side of said residual layer crystal cleaning liquid receiving part (46), and a cleaning liquid discharge hole (49) which connect to said connection tube (47), being radially extended from the inner circumferential surface side of the hub (41) to the outer circumferential edge of the flight (42) inside the wall of the hub (41) or the flight (42) of said screw conveyor (40), is provided; and the cleaning liquid inside of said residual layer crystal cleaning liquid receiving part (46) is directly jet spouted toward said residual layer object to be treated from the tip opening of said respective cleaning liquid discharge holes (49) which are opened at the outer circumferential edge of said flight (42).

5. The centrifugal separator (10A) of claim 4, wherein, in the tip surface of the outer circumferential edge of said flight (42), a channel (49*a*) which consecutively extends along the direction of the helix of the flight (42), and to which the tip opening of said respective cleaning liquid discharge holes (49) is connected is formed.

6. The centrifugal separator (10, 10A, 10B) of claim 5, wherein, into the inside of the hub (41) of said screw conveyor (40), a feed tube (60) for supplying the feed stock that extends in the axial direction of the hub (41) is inserted;

a cleaning liquid supply path (71) for supplying the cleaning liquid to the inside of said cleaning liquid receiving part (43) is formed inside of said feed tube (60), and at intermediate points on the feed tube (60) that are opposed to said cleaning liquid receiving part (43) in the radial direction, openings of said cleaning liquid supply path (71) are provided; and a residual layer crystal cleaning liquid supply path (72) for supplying the cleaning liquid to the inside of said residual layer crystal cleaning liquid receiving part (46) is formed inside of said feed tube (60), and at intermediate points on the feed tube (60) that are opposed to said residual layer crystal cleaning liquid receiving part (46) in the radial direction, openings of said residual layer crystal cleaning liquid supply path (72) are provided.

7. The centrifugal separator (10, 10A, 10B) of claim 4, wherein, into the inside of the hub (41) of said screw conveyor (40), a feed tube (60) for supplying the feed stock that extends in the axial direction of the hub (41) is inserted;

a cleaning liquid supply path (71) for supplying the cleaning liquid to the inside of said cleaning liquid receiving part (43) is formed inside of said feed tube (60), and at intermediate points on the feed tube (60) that are opposed to said cleaning liquid receiving part (43) in the radial direction, openings of said cleaning liquid supply path (71) are provided; and a residual layer crystal cleaning liquid supply path (72) for supplying the cleaning liquid to the inside of said residual layer crystal cleaning liquid receiving part (46) is formed inside of said feed tube (60), and at intermediate points on the feed tube (60) that are opposed to said residual layer crystal cleaning liquid receiving part (46) in the radial direction, openings of said residual layer crystal cleaning liquid supply path (72) are provided.

8. A centrifugal separator (10B) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein a residual layer crystal cleaning liquid receiving part (46) for receiving the cleaning liquid for cleaning the residual layer object to be treated formed in the clearance between the outer circumferential edge of the flight (42) of said screw conveyor (40) and the inner circumferential surface of said screen part (30) is provided inside of said cleaning liquid receiving part (43), being partitioned independently of the inside of said cleaning liquid receiving part (43);

in the locations adjacent to the surface (42$b$) on the side opposite to the object-to-be-treated conveying surface (42$a$) of said flight (42), a connection tube (47) is provided at prescribed intervals along the direction of the helix of said flight (42) on the bottom side of said residual layer crystal cleaning liquid receiving part (46), and in the hub (41) of said screw conveyor (40), a cleaning liquid connection hole (48) to which said connection tube (47) is connected is provided;

on the surface (42$b$) on the side opposite to the object-to-be-treated conveying surface (42$a$) of said flight (42), a cleaning liquid discharge pipe (80) which is connected to said cleaning liquid connection hole (48), extending in the radial direction from the inner circumferential edge to the outer circumferential edge of the flight (42), is mounted at prescribed intervals along the direction of the helix of the flight (42); and the cleaning liquid inside of said residual layer crystal cleaning liquid receiving part (46) is directly jet spouted toward said residual layer object to be treated from the tip opening of said cleaning liquid discharge pipe (80).

9. The centrifugal separator (10, 10A, 10B) of claim 8, wherein, into the inside of the hub (41) of said screw conveyor (40), a feed tube (60) for supplying the feed stock that extends in the axial direction of the hub (41) is inserted;

a cleaning liquid supply path (71) for supplying the cleaning liquid to the inside of said cleaning liquid receiving part (43) is formed inside of said feed tube (60), and at intermediate points on the feed tube (60) that are opposed to said cleaning liquid receiving part (43) in the radial direction, openings of said cleaning liquid supply path (71) are provided; and a residual layer crystal cleaning liquid supply path (72) for supplying the cleaning liquid to the inside of said residual layer crystal cleaning liquid receiving part (46) is formed inside of said feed tube (60), and at intermediate points on the feed tube (60) that are opposed to said residual layer crystal cleaning liquid receiving part (46) in the radial direction, openings of said residual layer crystal cleaning liquid supply path (72) are provided.

10. A centrifugal separator (10, 10C) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein inside of said cleaning liquid receiving part (43), a plurality of residual layer crystal cleaning liquid discharge holes (52) which are arranged at prescribed intervals along the direction of the helix of said flight (42) in the locations adjacent to the surface (42$b$) on the side opposite to the object-to-be-treated conveying surface (42$a$) of the flight (42) of said screw conveyor (40) is provided;

along the outer circumferential edge of the surface (42$b$) on the side opposite to the object-to-be-treated conveying surface (42$a$) of said flight (42), a cover flight (50) with a small width that extends in the direction of the helix of the flight (42) is mounted with a prescribed spacing being given with respect to the surface (42$b$) on the side opposite to the object-to-be-treated conveying surface (42$a$); and the cleaning liquid inside of said cleaning liquid receiving part (43) that springs out from said residual layer crystal cleaning liquid discharge holes (52) is directly jet spouted toward the residual layer object to be treated formed in the clearance between the outer circumferential edge of said flight (42) and the inner circumferential surface of said screen part (30) through the clearance between the outer circumferential edge of said flight (42) and said cover flight (50).

11. The centrifugal separator (10C) of claim 10, wherein said cleaning liquid receiving part (43) is provided with a partition plate (43*a*) which partitions the inside of the cleaning liquid receiving part (43) into two or more in the axial direction in the screen part (30) of said bowl (20) for allowing a particular cleaning range in said screen part (30) to be selected.

12. The centrifugal separator (10, 10C, 10D, 10E) of claim 11, wherein said cover flight (50) is mounted, being provided with a slope with respect to the surface (42*b*) on the side opposite to the object-to-be-treated conveying surface (42*a*) of said flight (42) such that the clearance is gradually narrowed down from the side closer to said hub (41) to the side closer to the outer circumferential edge of the flight (42), and is mounted through supporting plates (51) which are arranged at prescribed intervals.

13. The centrifugal separator (10, 10C, 10D, 10E) of claim 10, wherein said cover flight (50) is mounted, being provided with a slope with respect to the surface (42*b*) on the side opposite to the object-to-be-treated conveying surface (42*a*) of said flight (42) such that the clearance is gradually narrowed down from the side closer to said hub (41) to the side closer to the outer circumferential edge of the flight (42), and is mounted through supporting plates (51) which are arranged at prescribed intervals.

14. A centrifugal separator (10D) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein a residual layer crystal cleaning liquid receiving part (46) for receiving the cleaning liquid for cleaning the residual layer object to be treated formed in the clearance between the outer circumferential edge of the flight (42) of said screw conveyor (40) and the inner circumferential surface of said screen part (30) is provided inside of said cleaning liquid receiving part (43), being partitioned independently of the inside of said cleaning liquid receiving part (43);

inside of the locations adjacent to the surface (42*b*) on the side opposite to the object-to-be-treated conveying surface (42*a*) of said flight (42), a plurality of connection tubes (47) are provided at prescribed intervals along the direction of the helix of said flight (42) on the bottom side of said residual layer crystal cleaning liquid receiving part (46), and in the hub (41) of said screw conveyor (40), a plurality of residual layer crystal cleaning liquid discharge holes (52) to which said respective connection tubes (47) are connected, respectively, are provided;

along the outer circumferential edge of the surface (42*b*) on the side opposite to the object-to-be-treated conveying surface (42*a*) of said flight (42), a cover flight (50) with a small width that extends in the direction of the helix of the flight (42) is mounted with a prescribed spacing being given with respect to the surface (42*b*) on the side opposite to the object-to-be-treated conveying surface (42*a*); and the cleaning liquid inside of said residual layer crystal cleaning liquid receiving part (46) that springs out from said respective residual layer crystal cleaning liquid discharge holes (52) is directly jet spouted toward said residual layer object to be treated through the clearance between the outer circumferential edge of said flight (42) and said cover flight (50).

15. The centrifugal separator (10D) of claim 14, wherein, into the inside of the hub (41) of said screw conveyor (40), a feed tube (60) for supplying the feed stock that extends in the axial direction of the hub (41) is inserted;

a cleaning liquid supply path (71) for supplying the cleaning liquid to the inside of said cleaning liquid receiving part (43) is formed inside of said feed tube (60), and at intermediate points on the feed tube (60) that are opposed to said cleaning liquid receiving part (43) in the radial direction, openings of said cleaning liquid supply path (71) are provided; and a residual layer crystal cleaning liquid supply path (72) for supplying the cleaning liquid to the inside of said residual layer crystal cleaning liquid receiving part (46) is formed inside of said feed tube (60), and at intermediate points on the feed tube (60) that are opposed to said residual layer crystal cleaning liquid receiving part (46) in the radial direction, openings of said residual layer crystal cleaning liquid supply path (72) are provided.

16. The centrifugal separator (10, 10C, 10D, 10E) of claim 15, wherein said cover flight (50) is mounted, being provided with a slope with respect to the surface (42*b*) on the side opposite to the object-to-be-treated conveying surface (42*a*) of said flight (42) such that the clearance is gradually narrowed down from the side closer to said hub (41) to the side closer to the outer circumferential edge of the flight (42), and is mounted through supporting plates (51) which are arranged at prescribed intervals.

17. The centrifugal separator (10, 10C, 10D, 10E) of claim 14, wherein said cover flight (50) is mounted, being provided with a slope with respect to the surface (42*b*) on the side opposite to the object-to-be-treated conveying surface (42*a*) of said flight (42) such that the clearance is gradually narrowed down from the side closer to said hub (41) to the side closer to the outer circumferential edge of the flight (42), and is mounted through supporting plates (51) which are arranged at prescribed intervals.

18. A centrifugal separator (10E) which comprises a screw conveyor (40) inside of a bowl (20), supports them so as to be relatively rotatable, separates the object to be treated from a feed stock supplied to the inside of said bowl (20), and carries out cleaning and deliquidization of said object to be treated with a screen part (30) provided along the inner circumferential surface at one end of the bowl (20), a hub (41) of said screw conveyor (40) having a cleaning liquid receiving part (43) for receiving the cleaning liquid supplied to the inside of the hub (41) and a cleaning nozzle (45) which jet spouts the cleaning liquid from the inside of the cleaning liquid receiving part (43) toward said screen part (30), wherein inside of the hub (41) of said screw conveyor (40) on one side thereof, a residual layer crystal cleaning liquid receiving chamber (54) which receives the cleaning liquid for cleaning said residual layer object to be treated formed in the clearance between the outer circumferential edge of the flight (42) of the screw conveyor (40) and the inner circumferential surface of said screen part (30) is provided, being partitioned independently of said cleaning liquid receiving part (43);

on the outer circumference of the hub (41) of said screw conveyor (40), a plurality of residual layer crystal cleaning liquid introducing tubes (53) are arranged at prescribed intervals in the circumferential direction of the hub (41), being extended along the axial direction of the hub (41) so as to penetrate through said flight (42), respectively, with one end of the respective residual layer crystal cleaning liquid introducing tubes (53) being connected to the inside of said residual layer crystal cleaning liquid receiving chamber (54);

at intermediate points on said respective residual layer crystal cleaning liquid introducing tubes (53), a plurality of residual layer crystal cleaning liquid discharge holes (53*a*) which are arranged at prescribed intervals along the direction of the helix of the flight (42) of said screw conveyor (40) in the locations adjacent to the surface (42*b*) on the side opposite to the object-to-be-treated conveying surface (42*a*) of said flight (42) are provided;

along the outer circumferential edge of the surface (42*b*) on the side opposite to the object-to-be-treated conveying surface (42*a*) of said flight (42), a cover flight (50) with a small width that extends in the direction of the helix of the flight (42) is mounted with a prescribed spacing being given with respect to the surface (42*b*) on the side opposite to the object-to-be-treated conveying surface (42*a*); and the cleaning liquid which has been introduced into said respective residual layer crystal cleaning liquid introducing tubes (53) from said residual layer crystal cleaning liquid receiving chamber (54) and which springs out through said respective residual layer crystal cleaning liquid discharge holes (53*a*) is directly jet spouted toward said residual layer object to be treated through the clearance between the outer circumferential edge of said flight (42) and said cover flight (50).

19. The centrifugal separator (10, 10C, 10D, 10E) of claim 18, wherein said cover flight (50) is mounted, being provided with a slope with respect to the surface (42*b*) on the side opposite to the object-to-be-treated conveying surface (42*a*) of said flight (42) such that the clearance is gradually narrowed down from the side closer to said hub (41) to the side closer to the outer circumferential edge of the flight (42), and is mounted through supporting plates (51) which are arranged at prescribed intervals.

* * * * *